US008401196B2

(12) United States Patent
Goldberg et al.

(10) Patent No.: US 8,401,196 B2
(45) Date of Patent: Mar. 19, 2013

(54) METHOD AND APPARATUS FOR PERFORMING JRNSO IN FDD, TDD AND MIMO COMMUNICATIONS

(75) Inventors: Steven J. Goldberg, Downingtown, PA (US); Yogendra C. Shah, Exton, PA (US); Alexander Reznik, Titusville, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 587 days.

(21) Appl. No.: 12/106,926

(22) Filed: Apr. 21, 2008

(65) Prior Publication Data

US 2008/0259825 A1 Oct. 23, 2008

Related U.S. Application Data

(60) Provisional application No. 60/912,749, filed on Apr. 19, 2007, provisional application No. 60/941,978, filed on Jun. 5, 2007, provisional application No. 60/943,665, filed on Jun. 13, 2007, provisional application No. 60/976,686, filed on Oct. 1, 2007, provisional application No. 60/981,249, filed on Oct. 19, 2007.

(51) Int. Cl.
*H04L 9/00* (2006.01)
*H04L 9/32* (2006.01)
*H04M 3/00* (2006.01)
*G01R 31/08* (2006.01)

(52) U.S. Cl. ........ 380/283; 370/278; 380/249; 713/171; 713/175

(58) Field of Classification Search .................. 370/278, 370/287; 455/410, 411; 713/160, 176, 168, 713/169, 170, 171, 175, 180; 380/31, 44, 380/45, 262, 249, 283
See application file for complete search history.

(56) References Cited

U.S. PATENT DOCUMENTS 5,604,806 A * 2/1997 Hassan et al. ................... 380/44
(Continued)

FOREIGN PATENT DOCUMENTS

| EP | 1 764 946 | 3/2007 |
|----|-----------|--------|
| WO | 97/49213 | 12/1997 |
| WO | 2006/075243 | 7/2006 |
| WO | WO 2006075243 A1 * | 7/2006 |
| WO | 2006/081306 | 8/2006 |

OTHER PUBLICATIONS

Aono et al., "Wireless Secret Key Generation Exploiting Reactance-Domain Scalar Response of Multipath Fading Channels," IEEE Transactions on Antennas and Propagation, vol. 53, No. 11, pp. 3776-3784 (Nov. 2005).

(Continued)

*Primary Examiner* — Michael Thier
*Assistant Examiner* — Awet Haile
(74) *Attorney, Agent, or Firm* — Woodcock Washburn LLP

(57) ABSTRACT

A method and apparatus for performing Joint Randomness Not Shared by Others (JRNSO) is disclosed. In one embodiment, JRNSO is determined in Frequency Division Duplex (FDD) using a baseband signal loop back and private pilots. In another embodiment, JRNSO is determined in Time Division Duplex (TDD) using a baseband signal loop back and combinations of private pilots, private gain functions and Kalman filtering directional processing. In one example, the FDD and TDD JRSNO embodiments are performed in Single-Input-Single-Output (SISO) and Single-Input-Multiple-Output (SIMO) communications. In other examples, the FDD and TDD embodiments are performed in Multiple-Input-Multiple-Output (MIMO) and Multiple-Input-Single-Output (MISO) communications. JRNSO is determined by reducing MIMO and MISO communications to SISO or SIMO communications. JRNSO is also determined using determinants of MIMO channel products. Channel restrictions are removed by exploiting symmetric properties of matrix products.

29 Claims, 17 Drawing Sheets

U.S. PATENT DOCUMENTS

| | | |
|---|---|---|
| 6,614,857 B1 | 9/2003 | Buehrer |
| 6,683,907 B2 | 1/2004 | Ling |
| 6,700,919 B1 | 3/2004 | Papasakellariou |
| 6,940,914 B1 | 9/2005 | Lo |
| 7,398,087 B1 * | 7/2008 | McConnell et al. ....... 455/435.1 |
| 2002/0010684 A1 * | 1/2002 | Moskowitz ..................... 705/75 |
| 2002/0138733 A1 * | 9/2002 | Ishibashi et al. .............. 713/176 |
| 2007/0030827 A1 | 2/2007 | Rui et al. |
| 2007/0036353 A1 | 2/2007 | Reznik et al. |
| 2007/0177729 A1 | 8/2007 | Reznik et al. |
| 2008/0162937 A1 * | 7/2008 | Kohlenberg et al. .......... 713/171 |
| 2008/0304658 A1 * | 12/2008 | Yuda et al. ...................... 380/44 |
| 2009/0028262 A1 * | 1/2009 | Imai et al. .................... 375/267 |
| 2009/0310586 A1 * | 12/2009 | Shatti ............................ 370/338 |

OTHER PUBLICATIONS

Brookes, "Matrix Properties", Retrieved from http://www.ee.ic.ac.uk/hp/staff/dmb/matrix/property.html, Imperial College, (London, Last Updated On Dec. 30, 2006).

Guillaud et al., "A Practical Method For Wireless Channel Reciprocity Exploitation Through Relative Calibration", Proceedings of the Eighth International Symposium on Signal Processing and Its Applications, 2005, vol. 1, pp. 403-406, (Aug. 28-31, 2005).

Holter, "On The Capacity Of The MIMO Channel—A Tutorial Introduction—", In Processing Of IEEE Norwegian Symposium Signal Processing Trondheim, (Norway, Oct. 2001).

Rahman et al., "Hot Topic: Security Based on Exploiting Reciprocal Channels in Wireless Systems", EDAS Paper #: 1568986895, Submitted to Mobicom 2006.

Wikipedia, "Cauchy-Binet Formula", Retrieved From http://en.wikipedia.org/wiki/Cauchy-Binet_formula, (Last Updated On Jan. 28, 2008).

Ogawa et al., "A Scheme of Secret Agreement Based on Change of Eigenvalue of Correlation Matrix in MIMO-OFDM Systems", Technical Report of IEICE, CS2004-257, Jan. 2005, 127-132.

* cited by examiner

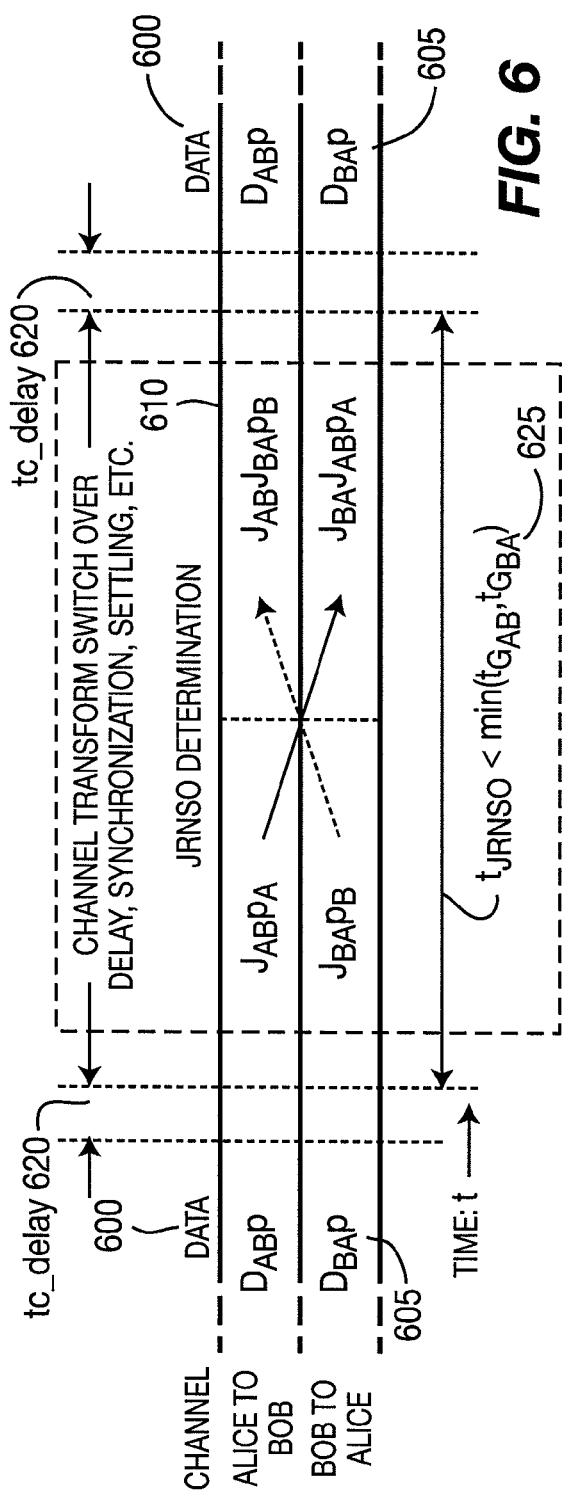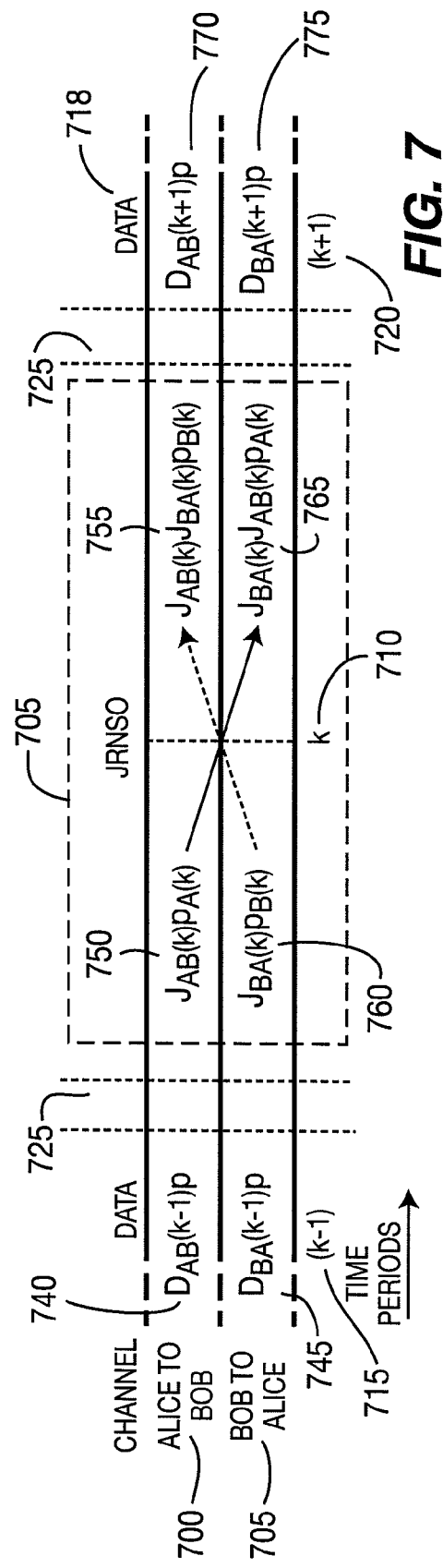

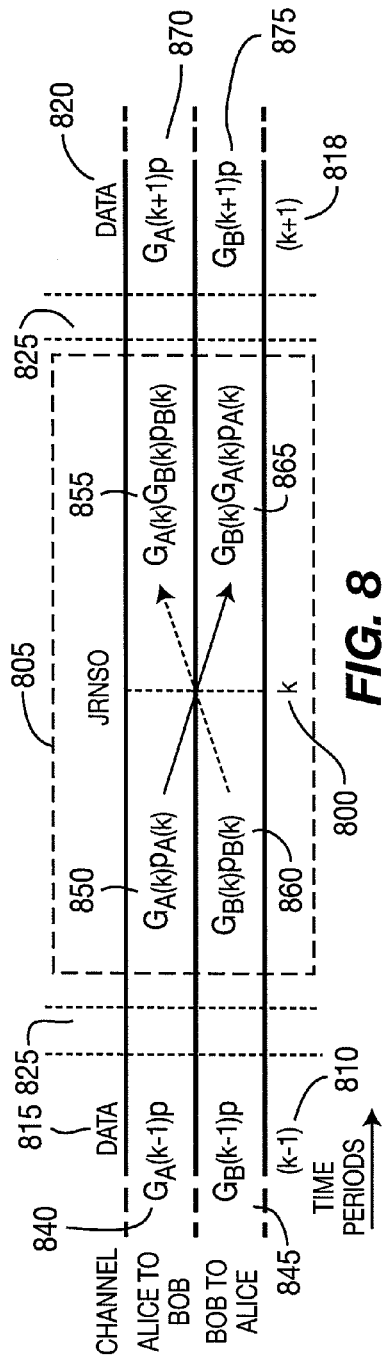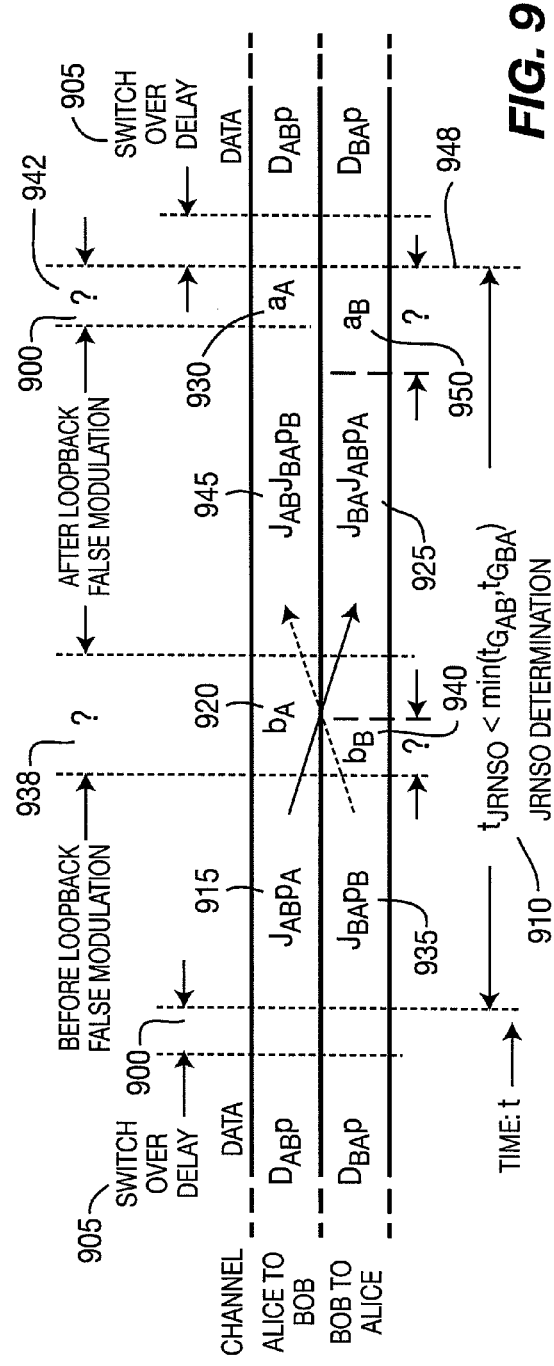

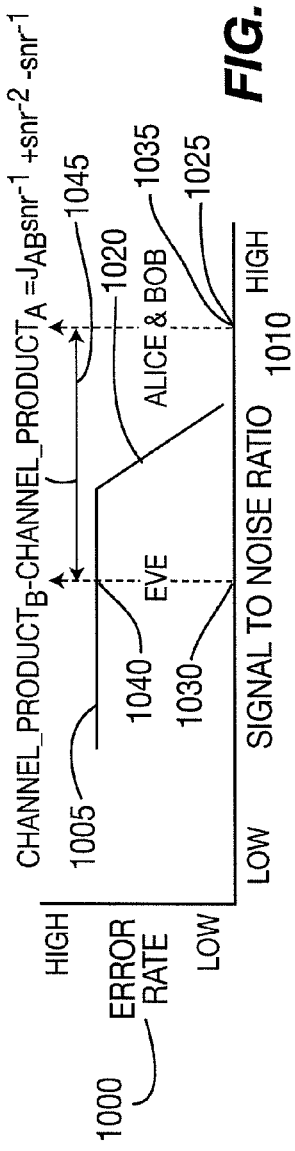
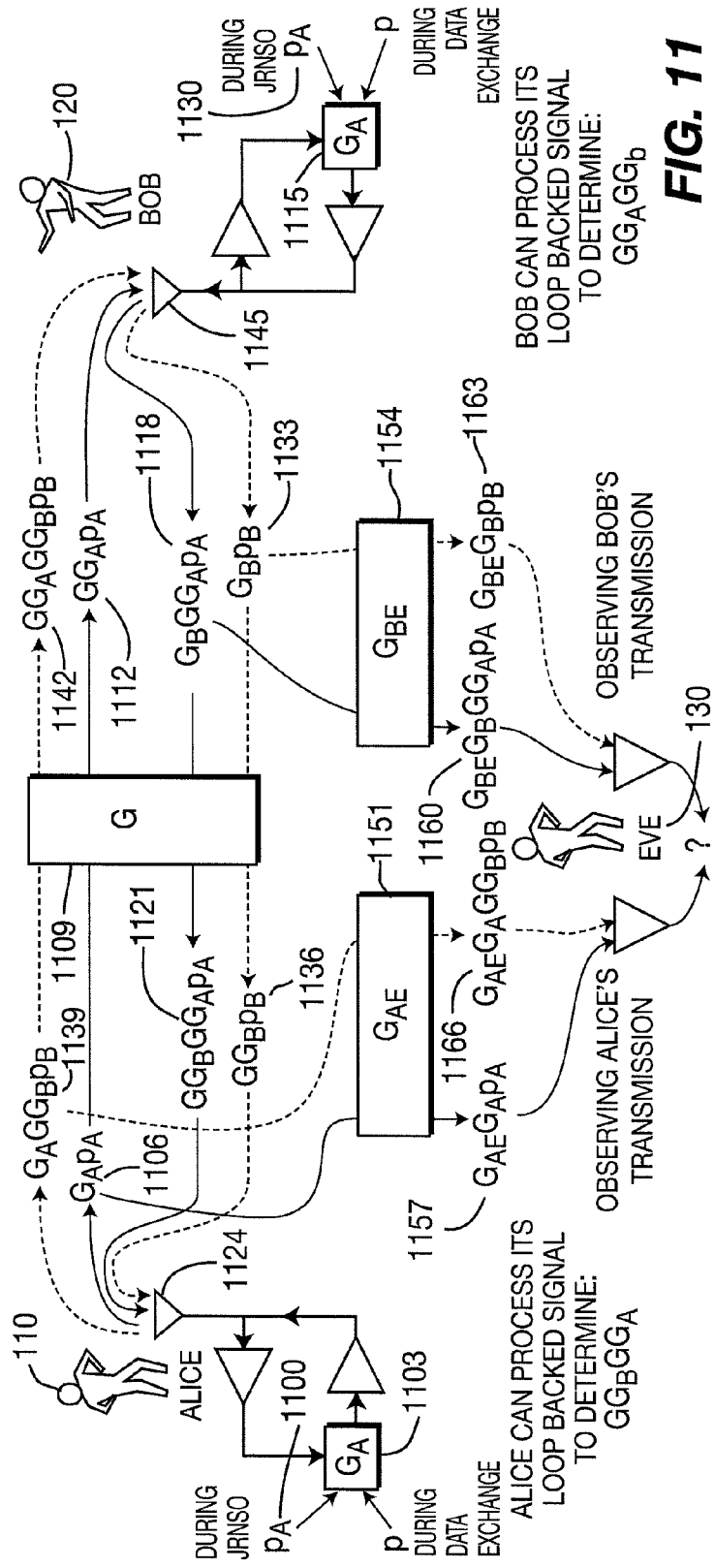

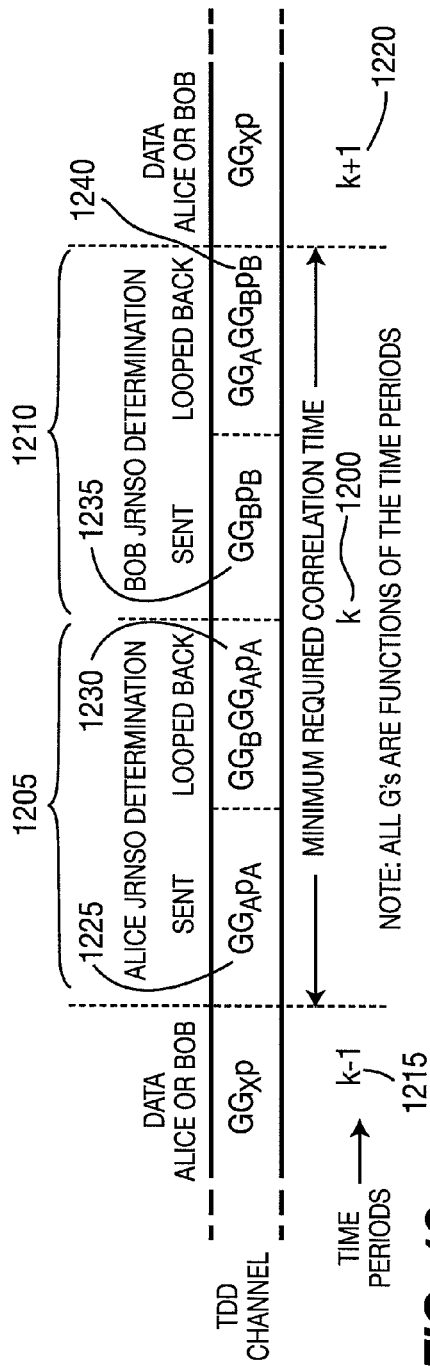
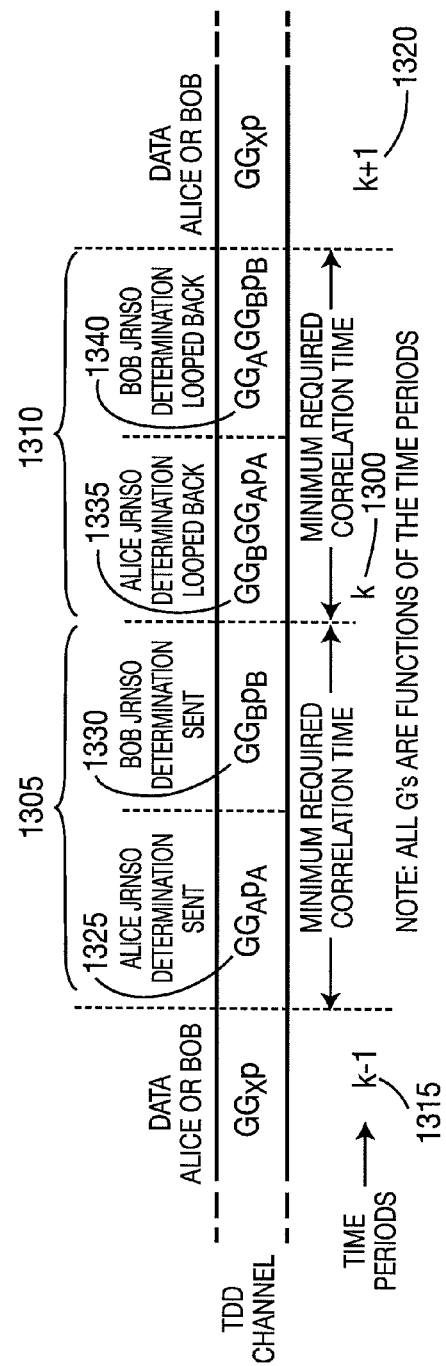
FIG. 12
FIG. 13

| REF | TRANS-MISSION TYPE | ALICE TRANS-MITTER 1 | ALICE TRANS-MITTER 2 | BOB TRANS-MITTER 1 | BOB TRANS-MITTER 2 | ALICE RECEIVER 1 | ALICE RECEIVER 2 | BOB RECEIVER 1 | BOB RECEIVER 2 |
|---|---|---|---|---|---|---|---|---|---|
| 1 | PRIMARY | $p_{A1}$ | | $p_{B1}$ | | $J_{B1A1}p_{B1}$ | $J_{B1A2}p_{B1}$ | $J_{A1B1}p_{A1}$ | $J_{A1B2}p_{A1}$ |
| 2 | LOOP BACK | $J_{B1A1}p_{B1}$ | | | $J_{A1B1}p_{A1}$ | $J_{B1A1}J_{A1B1}p_{B1}$ | $J_{B1A2}J_{A1B1}p_{A1}$ | $J_{A1B1}J_{B1A1}p_{B1}$ | $J_{A1B2}J_{B1A1}p_{B1}$ |
| 3 | LOOP BACK | | $J_{B1A1}p_{B1}$ | $J_{A1B1}p_{A1}$ | | $J_{B2A1}J_{A1B1}p_{A1}$ | $J_{B2A2}J_{A1B1}p_{A1}$ | $J_{A2B1}J_{B1A1}p_{B1}$ | $J_{A2B2}J_{B1A1}p_{B1}$ |
| 4 | LOOP BACK | $J_{B1A2}p_{B1}$ | | | $J_{A1B2}p_{A1}$ | $J_{B1A1}J_{A1B2}p_{A1}$ | $J_{B1A2}J_{A1B2}p_{A1}$ | $J_{A1B1}J_{B1A2}p_{B1}$ | $J_{A1B2}J_{B1A2}p_{B1}$ |
| 5 | LOOP BACK | | $J_{B1A2}p_{B1}$ | $J_{A1B2}p_{A1}$ | | $J_{B2A1}J_{A1B2}p_{A1}$ | $J_{B2A2}J_{A1B2}p_{A1}$ | $J_{A2B1}J_{B1A2}p_{B1}$ | $J_{A2B2}J_{B1A2}p_{B1}$ |
| 6 | PRIMARY | | $p_{A2}$ | | $p_{B2}$ | $J_{B2A1}p_{B2}$ | $J_{B2A2}p_{B2}$ | $J_{A2B1}p_{A2}$ | $J_{A2B2}p_{A2}$ |
| 7 | LOOP BACK | $J_{B2A1}p_{B2}$ | | | $J_{A2B1}p_{A2}$ | $J_{B1A1}J_{A2B1}p_{A2}$ | $J_{B1A2}J_{A2B1}p_{A2}$ | $J_{A1B1}J_{B2A1}p_{B2}$ | $J_{A1B2}J_{B2A1}p_{B2}$ |
| 8 | LOOP BACK | | $J_{B2A1}p_{B2}$ | $J_{A2B1}p_{A2}$ | | $J_{B2A1}J_{A2B1}p_{A2}$ | $J_{B2A2}J_{A2B1}p_{A2}$ | $J_{A2B1}J_{B2A1}p_{B2}$ | $J_{A2B2}J_{B2A1}p_{B2}$ |
| 9 | LOOP BACK | $J_{B2A2}p_{B2}$ | | | $J_{A2B2}p_{A2}$ | $J_{B1A1}J_{A2B2}p_{A2}$ | $J_{B1A2}J_{A2B2}p_{A2}$ | $J_{A1B1}J_{B2A2}p_{B2}$ | $J_{A1B2}J_{B2A2}p_{B2}$ |
| 10 | LOOP BACK | | $J_{B2A2}p_{B2}$ | | $J_{A2B2}p_{A2}$ | $J_{B2A1}J_{A2B2}p_{A2}$ | $J_{B2A2}J_{A2B2}p_{A2}$ | $J_{A2B1}J_{B2A2}p_{B2}$ | $J_{A2B2}J_{B2A2}p_{B2}$ |

*FIG. 20*

| REF | TRANS-MISSION TYPE | ALICE TRANSMISSION | BOB TRANSMISSION | ALICE RECEIVE | BOB RECEIVE |
|---|---|---|---|---|---|
| 1 | PRIMARY | $J_{A_{1,2}}P_A$ | $J_B P_B$ | $J_{BA_{1,2}}P_B$ $J_{BA_{2,3}}P_B$ | $J_{A_{1,2}B}P_A$ |
| 2 | LOOP BACK | $J_{A_{1,2}}J_{BA_{1,2}}P_B$ | $J_B J_{A_{1,2}B}P_A$ | $J_{BA_{1,2}}J_{A_{1,2}B}P_A$ $J_{BA_{2,3}}J_{A_{1,2}B}P_A$ | $J_{A_{1,2}}J_{BA_{1,2}}P_B$ |
| 3 | LOOP BACK | $J_{A_{1,2}}J_{BA_{2,3}}P_B$ | | | $J_{A_{1,2}B}J_{BA_{2,3}}P_B$ |

METHOD AND APPARATUS FOR PERFORMING JRNSO IN FDD, TDD AND MIMO COMMUNICATIONS

CROSS REFERENCE TO RELATED APPLICATIONS

This application claims the benefit of U.S. provisional application Nos. 60/912,749 filed on Apr. 19, 2007, 60/941,978 filed on Jun. 5, 2007, 60/943,665 filed on Jun. 13, 2007, 60/976,686 filed on Oct. 1, 2007, and 60/981,249 filed on Oct. 19, 2007, all of which are incorporated by reference as if fully set forth.

FIELD OF INVENTION

This application is related to wireless communications.

BACKGROUND

Developments in cryptographic theory demonstrate how information theoretic secrecy can be generated from sources of joint randomness under the assumption that the potential attacker/eavesdropper does not significantly share the same source of randomness. These developments may be particularly well-suited for use in secrecy generation in wireless communication systems due to the nature of the wireless communication medium.

In order to communicate secretly, information-theoretic security could be used to protect communications between two terminuses, from being discovered by an attacker entity. Most wireless channels have a constantly changing physical property, which provides a lot of randomness on the terminus's channel observations. This is called this Joint Randomness Not Shared by Others (JRNSO) and is the subject of U.S. patent application Ser. No. 11/339,958.

In the prior art, JRNSO typically relies on two terminuses observing essentially the same Channel Impulse Response (CIR), a situation inherent to Time Division Duplex (TDD) where there is one reciprocal channel. Many communication systems however utilize Frequency Division Duplex (FDD), where two terminuses typically do not observe essentially the same channel impulse response due to the fact the signal transmission in each direction is on a significantly different channel frequency. Further, there is a need to make JRNSO based encryption in TDD applications more robust, and to expand JRNSO to environments which do not naturally produce sufficient JRNSO information. This could be due to the channel not being as close to true reciprocity as required for the application. These techniques are applicable to Single-Input-Single-Output (SISO) and Single-Input-Multiple-Output (SIMO) systems. Finally, there is a need to extend JRNSO to more sophisticated communication systems which use multiple-input-multiple-output (MIMO) or multiple-input-single-output (MISO) antenna arrays.

SUMMARY

Methods and apparatus for determining JRNSO are disclosed. In one embodiment, JRNSO is determined in FDD using a baseband signal loop back and private pilots. In another embodiment, JRNSO is determined in TDD using a baseband signal loop back and combinations of private pilots, private gain functions and optionally Kalman filtering or similar time directional processing. In one example, the FDD and TDD JRSNO embodiments are performed in SISO and SIMO communication steps. In other examples, the FDD and TDD embodiments are performed in MIMO communications. JRNSO is determined by reducing MIMO and MISO communications to SISO or SIMO communications. In still other embodiments channel measurement signaling restrictions are removed by exploiting symmetric properties of matrix products, such as determinants.

BRIEF DESCRIPTION OF THE DRAWINGS

A more detailed understanding may be had from the following description, given by way of example in conjunction with the accompanying drawings wherein:

FIG. 6 shows an example of a JRNSO channel modification process in FDD as a function of time;

FIG. 7 shows an example of JRNSO channel utilization in FDD as a function of time;

FIG. 8 shows an example of JRNSO channel utilization using simplification assumptions in FDD as a function of time;

FIG. 9 shows an example of a JRNSO signal process in FDD using random time positioning of a loop back signal;

FIG. 10 shows an example of the relationship of signal to noise ratio to an error rate;

FIG. 11 shows an example of a JRNSO procedure in TDD using a loop back approach with public pilots and private gain functions;

FIG. 12 shows an example of a JRNSO signal process in TDD as a function of time;

FIG. 13 shows an example of a JRNSO signal process in TDD using paired like transmissions;

FIG. 20 shows an example of derivable channel products in MIMO;

DETAILED DESCRIPTION

When referred to hereafter, the terminology "wireless transmit/receive unit (WTRU)" includes but is not limited to a user equipment (UE), a mobile station, a fixed or mobile subscriber unit, a pager, a cellular telephone, a personal digital assistant (PDA), a computer, or any other type of user device capable of operating in a wireless environment. When referred to hereafter, the terminology "base station" includes but is not limited to a Node-B, a site controller, an access point (AP), or any other type of interfacing device capable of operating in a wireless environment.

Figure 1:
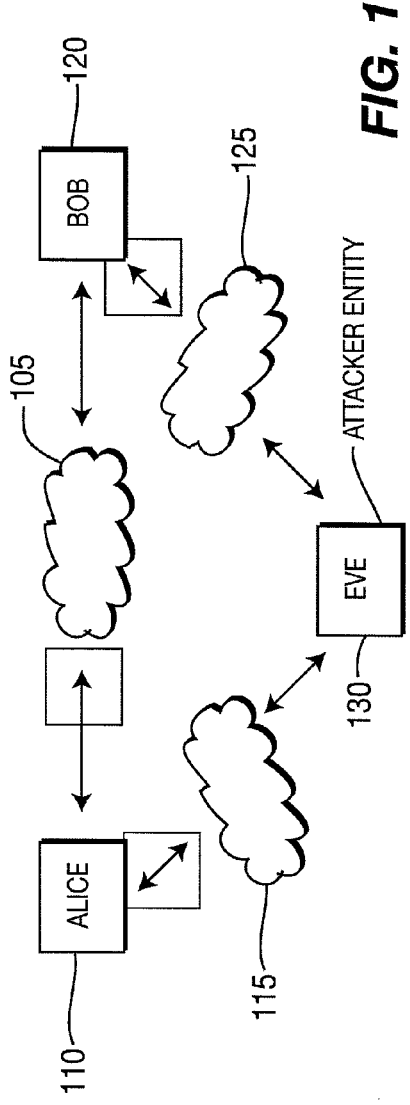
FIG. 1 shows an example of a block diagram of a wireless communication system configured to use JRNSO.

FIG. 1 shows an example of a block diagram of a wireless communication system 100 configured to use JRNSO. A Radio Frequency (RF) communication channel set 105 between wireless transmit/receive units (WTRUs), here Alice 110 and Bob 120, is shown. Eve 130 is an attacker entity who may monitor the RF communication channel set 105 between Alice 110 and Bob 120. Let Alice 110 and Bob 120 be two wireless terminuses, which communicate with each other on the same frequency in a wireless environment. Due to the channel reciprocity, if these two terminuses observe their mutual channels 105 at approximately the same time, their observations will be very similar to each other. A third terminal, Eve 130 is shown located more than a wavelength away from Alice 110 and Bob 120, and the channel observations 115 and 125 by Eve 130 are almost certainly independent from the channel-specific observations by Alice 110 or Bob 120.

Therefore, Alice 110 and Bob 120 could generate a common secret key between them based on their channel observations. In generating such a key, Alice 110 and Bob 120 may need to communicate with each other using one of the loop back signaling procedures described below.

Figure 2:
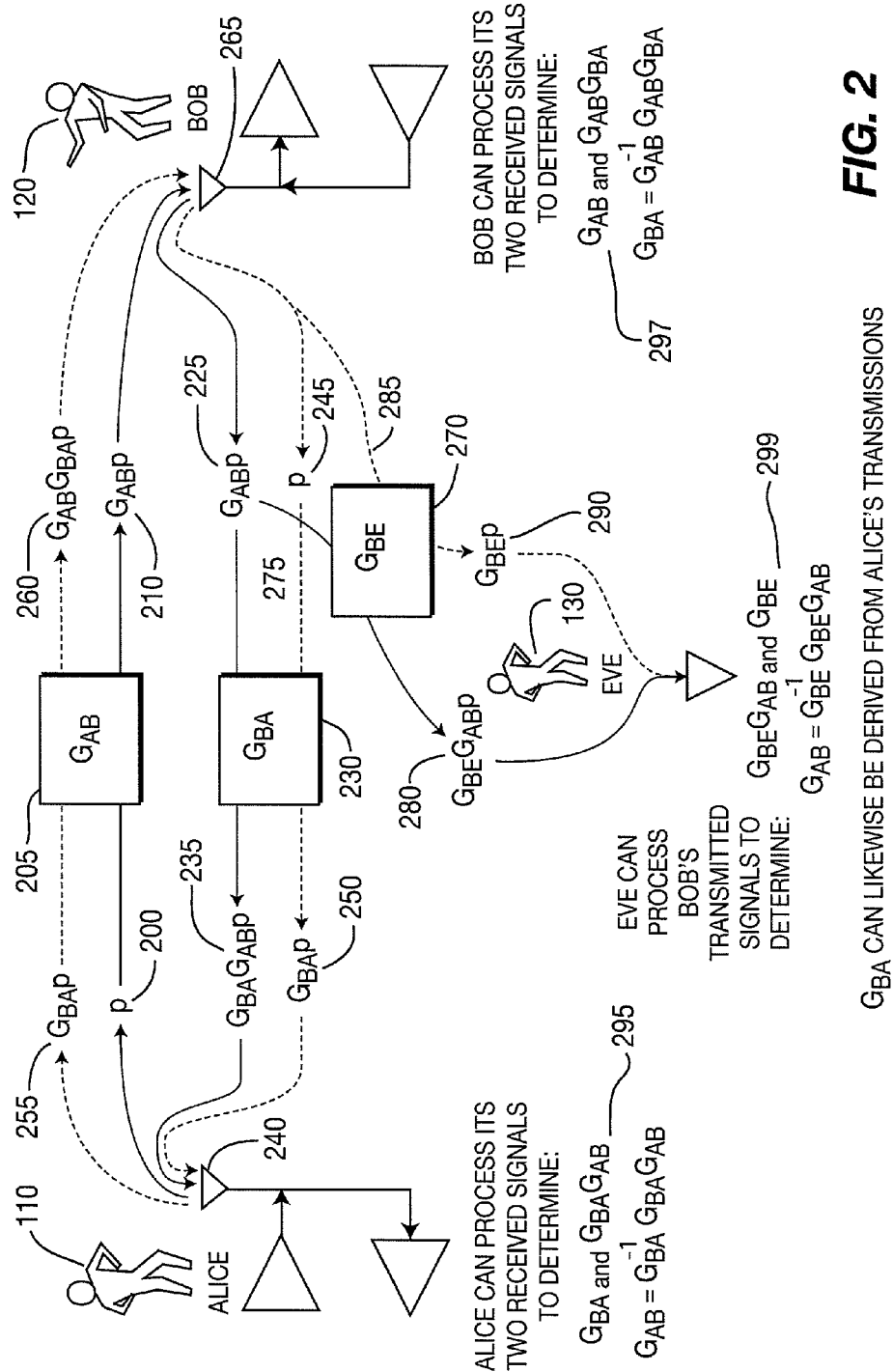
FIG. 2 shows an example of a JRNSO procedure in FDD using a loop back approach and public pilots.

FIG. 2 shows an example of a JRNSO procedure performed by the system of FIG. 1. In this example, a loop back approach is used in a Frequency Division Duplex (FDD) mode using public pilots. A solid line indicates Alice's 110 loop back process. A dashed line indicates Bob's 120 loop back process.

Alice 110 initiates her loop back process by transmitting a public pilot p 200 to Bob 120 over channel $G_{AB}$ 205, creating a resulting signal $G_{AB}p$ 210. Bob 120 receives the signal $G_{AB}p$ 210 and translates the signal to baseband. Bob 120 does not otherwise process the signal. Bob 120 sends the signal back to Alice 110 over a channel with a different frequency $G_{BA}$ 230, which creates a resulting signal $G_{BA}G_{AB}p$ 235. Alice 110 receives the looped back signal $G_{BA}G_{AB}p$ at 240 completing her loop back process.

Bob 120 initiates his loop back process by transmitting a public pilot p 245 to Alice 110 over channel $G_{BA}$ 230, creating a resulting signal $G_{BA}p$ 250. Alice 110 receives the signal $G_{BA}p$ 250 and translates the signal to baseband. Alice 110 does not otherwise process the signal. Alice 110 sends the signal back to Bob 120 over a channel with a different frequency $G_{AB}$ 205, which creates a resulting signal $G_{AB}G_{BA}p$ 260. Bob 120 receives the looped back signal $G_{AB}G_{BA}p$ 260 at 265 completing his loop back process.

During the communication, Eve 130 may monitor Bob's 120 transmitted signals over channel $G_{BE}$ 270, which will allow Eve 130 to observe the resulting signals $G_{BE}G_{AB}p$ 280 and $G_{BE}p$ 290. Although not depicted in FIG. 2, Eve 130 may also monitor Alice's 110 transmitted signals over channel $G_{AE}$, which will allow Eve 130 to observe the resulting signals $G_{AE}p$ and $G_{AE}G_{BA}p$.

When, the loop back process has been completed for Alice 110 and Bob 120, then Alice 110 has observed at 240 $G_{BA}G_{AB}p$ 235 and $G_{BA}p$ 250; and Bob 120 has observed at 265 $G_{AB}p$ 210 and $G_{AB}G_{BA}p$ 260. Alice 110 processes her two received signals to determine $G_{BA}$ and $G_{AB}$. Similarly, Bob 120 processes his two received signals to determine $G_{AB}$ and $G_{BA}$. Eve 130 has observed $G_{BE}p$, $G_{BE}G_{AB}p$, $G_{AE}p$ and $G_{AE}G_{BA}p$. Eve 130 knows the public pilots, so she can determine $G_{BE}$, $G_{BE}G_{AB}$, $G_{AE}$ and $G_{AE}G_{BA}$. Given these four, Eve 130 can perform further calculations and determine $G_{AB}$ and $G_{BA}$. This shows that a basic FDD enablement of channel information sharing between Alice 110 and Bob 120 while possible is not secure against Eve 130 when using public pilots.

Figure 3:
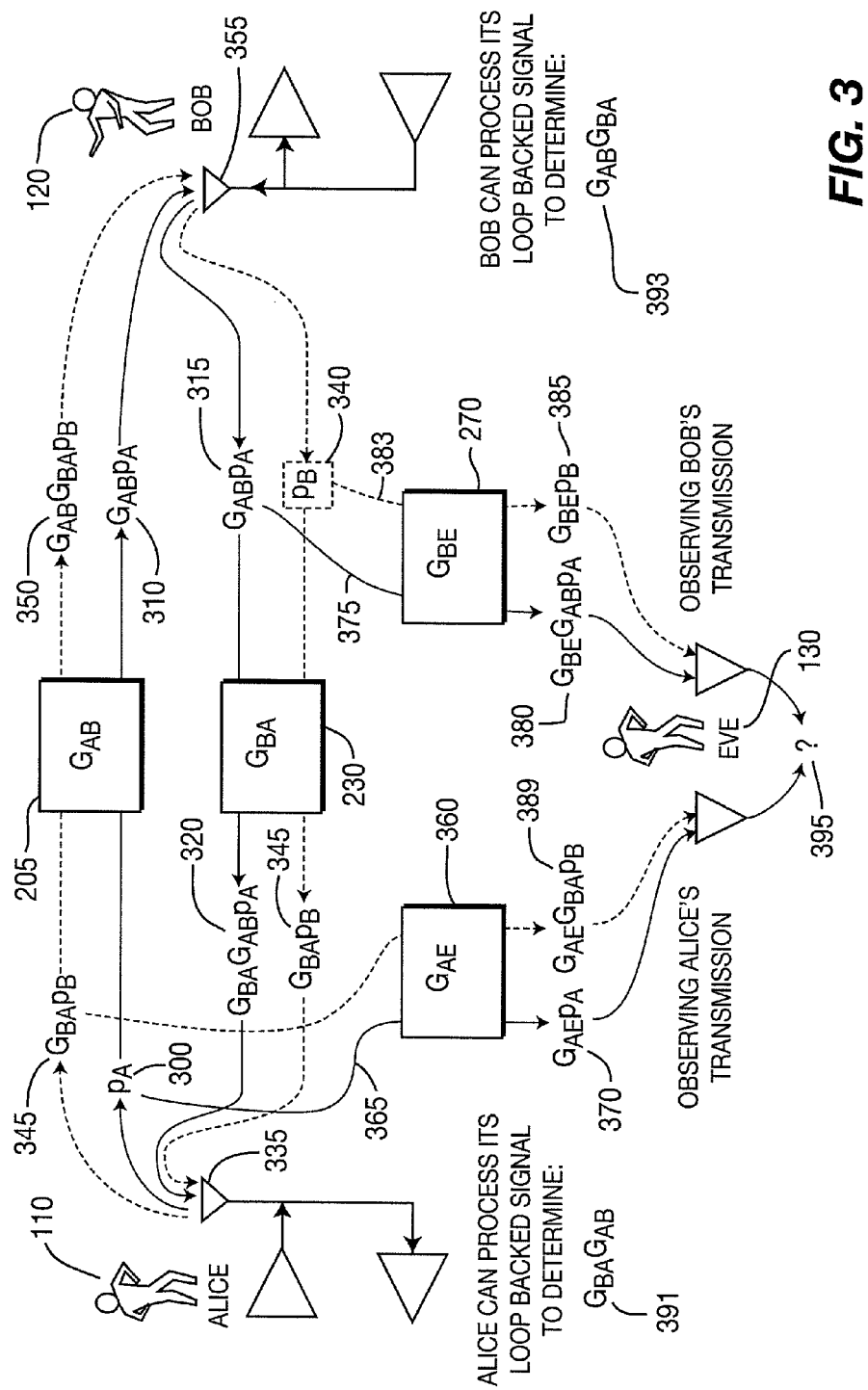
FIG. 3 shows an example of a JRNSO procedure in FDD using a loop back approach and private pilots.

FIG. 3 is an example of a JRNSO procedure performed by the system of FIG. 1 which is secure against Eve 130. In this example, a loop back approach is used in a Frequency Division Duplex (FDD) mode using private pilots known only to the respective initial sender, Alice 110 or Bob 120. While Alice's 110 loop back cycle is discussed first, the JRNSO process is most efficient when Alice and Bob initiate their respective loop back cycles simultaneously.

Alice 110 initiates her loop back process by transmitting a private pilot $p_A$ 300 to Bob 120 over channel $G_{AB}$ 205, creating a resulting signal $G_{AB}p_A$ 310. Bob 120 receives the signal $G_{AB}p_A$ 310 and translates the signal to baseband. Bob 120 does not otherwise process the signal or attempt to exploit it. Bob 120 sends the signal back to Alice 110 over a channel with a different frequency $G_{BA}$ 230, which creates a resulting signal $G_{BA}G_{AB}p_A$ 320. Alice 110 receives the looped back signal $G_{BA}G_{AB}p_A$ at 335 completing her loop back process.

Bob 120 initiates his loop back process at nearly the same time as Alice by transmitting a private pilot $p_B$ 340 to Alice 110 over channel $G_{BA}$ 230, creating a resulting signal $G_{BA}p_B$ 345. Alice 110 receives the signal $G_{BA}p_B$ 250 at 335 and translates the signal to baseband. Alice 110 does not otherwise process the signal or attempt to exploit it. Alice 110 sends the signal $G_{BA}p_B$ 345 back to Bob 120 over a channel with a different frequency $G_{AB}$ 205, which creates a resulting signal $G_{AB}G_{BA}\ p_B$ 350. Bob 120 receives the loop backed signal at 355 completing his loop back process.

Note that while from a general standpoint Alice 110 and Bob 120 need not be simultaneously performing their measurements, it is advisable from the standpoint of most likely having the signal measurements occur with correlated channel effects.

During the communication between Alice 110 and Bob 120, Eve 130 may monitor Alice's 110 transmitted signals over channel $G_{AE}$ 360 and Bob's 120 transmitted signals over channel $G_{BE}$ 270. If Eve 130 is monitoring Alice's 110 transmissions, Eve 130 observes the signals $G_{AE}p_A$ 370 and $G_{AE}G_{BA}p_B$ 389. If Eve 130 is monitoring Bob's 120 transmissions, Eve observes the signals $G_{BE}p_B$ 385 and $G_{BE}G_{AB}p_A$ 380.

After the loop back process has been completed for Alice 110 and Bob 120, Alice 110 has observed at 335 $G_{BA}G_{AB}p_A$ 320 and $G_{BA}p_B$ 345; and Bob 120 has observed at 355 $G_{AB}p_A$ 310 and $G_{AB}G_{BA}p_B$ 350. Alice however is not able to process $G_{BA}p_B$ 345 since she does not know $p_B$. Likewise Bob can not determine $G_{AB}p_A$ 315, because Alice 110 and Bob 120 respectively, know the private pilots they used, Alice 110 can calculate the channel matrix product $G_{BA}G_{AB}$ 391, and Bob 120 can calculate the channel matrix product $G_{AB}G_{BA}$ 393. In this example, Alice 110 and Bob 120 use single-input-single-output (SISO) signaling so that the channel matrices are Rank 1. Therefore, the channel matrices degenerate to a single value and are commutative (e.g. $G_{AB}G_{BA}$ 393=$G_{BA}G_{AB}$ 391). Alice 110 and Bob 120, can then determine essentially identical CIRs.

Due to the private nature of the pilots in this example, Eve 130 is unable to separate the channel induced scaling, skewing, and rotational effects from the settings inherent to the private pilots. From the standpoint of the equations, the pilots can not be separated from the channel matrices. Therefore, Eve 130 is unable to determine $G_{BA}G_{AB}$ 391.

Figure 4:
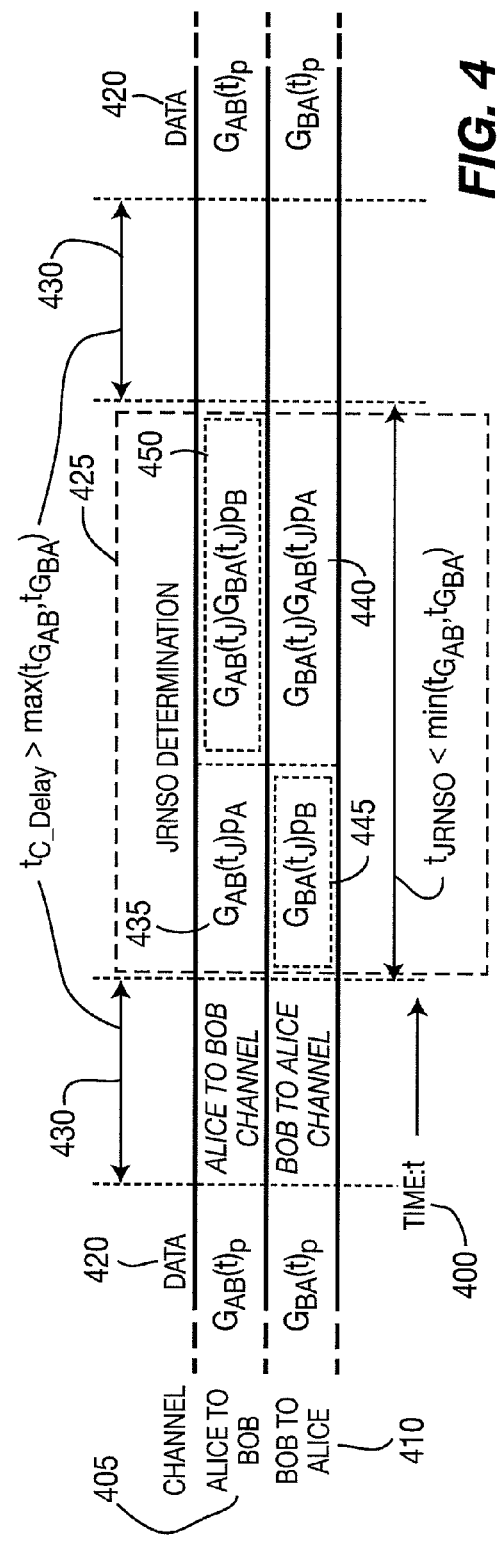
FIG. 4 shows an example of a JRNSO signal process in FDD as a function of time.

FIG. 4 is an example of the channel utilization time constraints of the signaling process depicted in FIG. 3. In this example, Alice 110 and Bob 120 use private pilots during the JRNSO determination period and public pilots during the data transmission periods. There are two channels: an Alice to Bob channel $G_{AB}$ 405 on a certain frequency, and a Bob to Alice channel $G_{BA}$ 410 on a different frequency. Data transmission periods are depicted at 420. A JRNSO determination period is depicted at 425. Time delays ($t_{c\_delay}$) are depicted at 430 and occur between the data periods 420 and the JRNSO period tJRNSO 425. There is a public pilot p which Alice 110 and Bob 120 use during data transmission periods 420. There is a private pilot $p_A$, known only to Alice 110, which Alice 110 transmits during the JRNSO period 425 to initiate her loop back process. There is a private pilot $p_B$, known only to Bob 120, which Bob 120 transmits during the JRNSO period 425 to initiate his loop back process.

In the example of FIG. 4, channel transforms are shown as a function of time. Time t increases from left to right. First, there is a data period 420. Then, there is a tc_delay 430 while Alice 110 and Bob 120 switch to a JRSNO mode. Then, Alice 110 and Bob 120 start the JRSNO process. Alice 110 initiates her loop back cycle by sending a private pilot $p_A$ over channel $G_{AB}$ to Bob 120, resulting in a signal $G_{AB}(t_j)p_A$ 435. Bob 120 translates the signal to baseband but does not otherwise process the signal. Bob 120 sends the return signal back to Alice 110. Alice 110 receives and processes the looped back signal.

At the same time that Alice 110 initiates her loop back process, Bob 120 initiates his loop back process by sending a private pilot $p_B$ over channel $G_{BA}$ to Alice 110, resulting in a signal $G_{BA}(t_j)p_B$ 445. Alice 110 translates the signal to baseband but does not otherwise process the signal. Alice 110 sends the return signal back to Bob 120. Then, Bob 120 receives and processes the looped back signal.

When the JRNSO determination period is complete, there is a time delay 430 as Alice 110 and Bob 120 switch to a non-JRNSO mode.

As shown in the example of FIG. 4, and to ensure security from Eve 130, the time delay between the data periods and the JRNSO period exceeds the maximum coherence time of either channel $tG_{AB}$ and $tG_{BA}$, where tc_delay>max($tG_{AB}$, $tG_{BA}$). As further shown in the example of FIG. 4, the JRNSO period is less than the minimum coherence time of either channel, where $t_{JRNSO}$<min($tG_{AB}$,$tG_{BA}$). The delay tc_delay is necessary to prevent Eve 130 from determining essentially the same channel parameters that exist during the JRNSO time period from the data period. The maximum observation time $t_{JRNSO}$ is necessary to assume that Alice 110 and Bob 120 measure essentially the same channel effects during the measurement period Some applications, for example e-mail, file transfer, buffered streaming audio or video, are tolerant of a long tc_delay. Other applications, for example audio conversations, can not tolerate a long tc_delay, and it is necessary to reduce the tc_delay. The tc_delay also has an impact on the overall utilization of the radio channels. It is therefore desirable to reduce its duration to improve the utilization of the channel for data transfer and JRNSO purposes.

In one embodiment, the tc_delay 430 is reduced by using special pilot constellations during the data periods. The pilot constellations, which are functions of the JRNSO determinations, are known to both Alice 110 and Bob 120, but not to Eve 130. Therefore, Alice 110 and Bob 120, who know more than Eve 130, can calculate the channel transforms. Eve 130, however, can only calculate the channel transforms if Eve 130 synchronizes all four data streams to the same instant.

Figure 5:
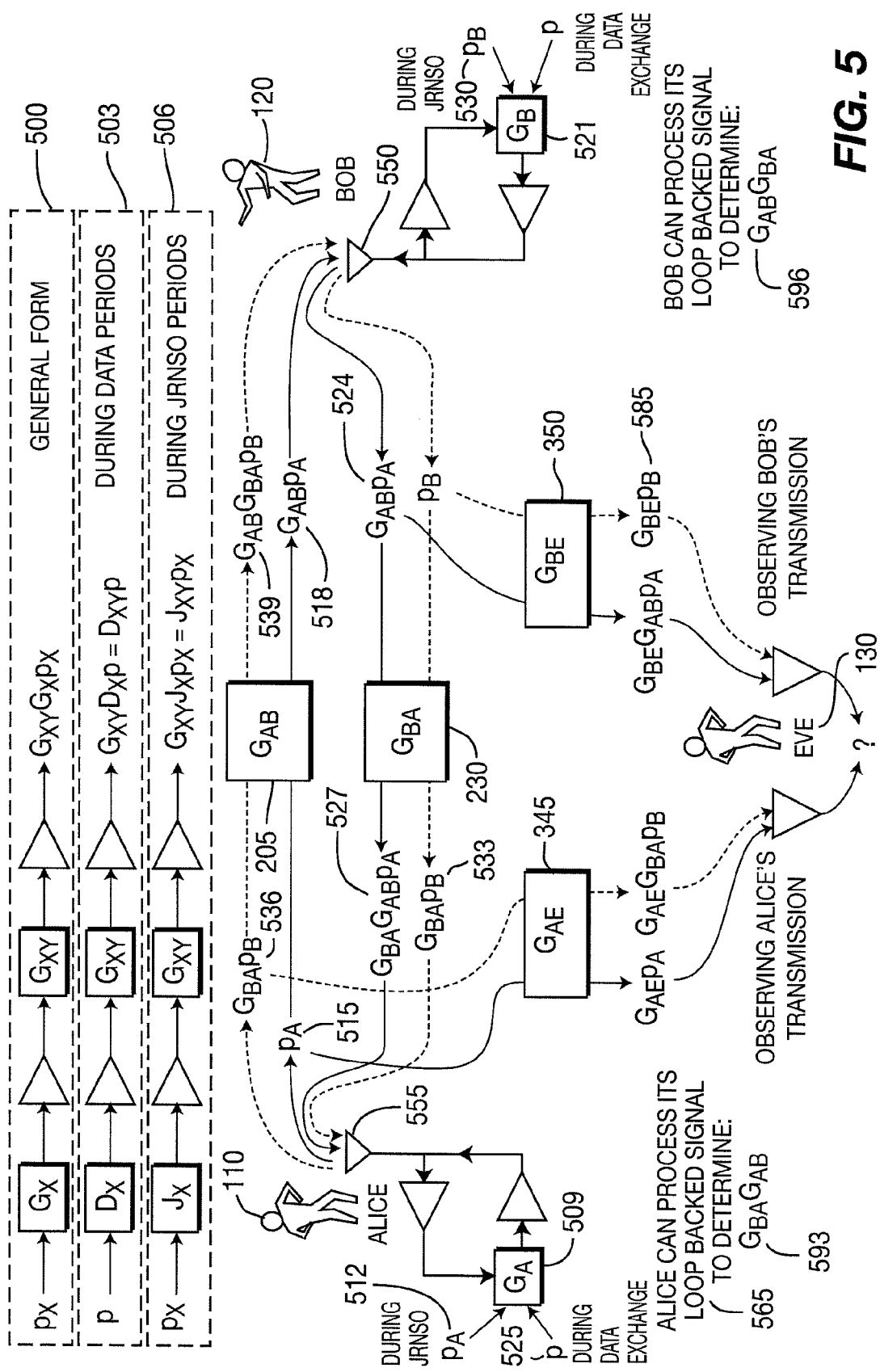
FIG. 5 shows an example of a JRNSO channel modification process in FDD.

In another embodiment, the tc_delay 430 is reduced by modifying the channel transforms between the data periods and JRNSO periods. FIG. 5 is an example of a JRNSO procedure performed by the system of FIG. 1, here showing a general overall channel modification system in FDD mode. In this example, the channel transforms between Alice 110, Bob 120 and Eve 130 are modified so that the channel transforms during the JRNSO periods differ from the channel transforms during the data periods.

$G_{AB}$, $G_{BA}$, $G_{AE}$, $G_{BE}$ are the channel transforms between Alice 110, Bob 120 and Eve 130 under normal conditions.

$J_{AB}$, $J_{BA}$, $J_{AE}$, $J_{BE}$ are the channel transforms between Alice 110, Bob 120 and Eve 130 during JRNSO periods.

$D_{AB}$, $D_{BA}$, $D_{AE}$, $D_{BE}$ are the channel transforms between Alice 110, Bob 120 and Eve 130 during data periods.

An example of a general form channel transform is depicted at 500, where the resulting channel matrix is $G_{XY}G_Xp_X$. An example of a channel transform during data periods is depicted at 503, where the resulting channel matrix $G_{XY}D_Xp=D_{XY}p$. An example of a channel transform during JRNSO periods is depicted at 506, where the channel matrix is $G_{XY}J_XP_X=J_{XY}p_X$.

In this example, Alice 110 and Bob 120 apply respective functions $G_A$ and $G_B$ each time they transmit a signal.

$G_A$ is any function applied by Alice 110 that modifies the channel transform so that the channel transform during JRNSO periods differs from the channel transform during data periods.

$G_B$ is any function applied by Bob 120 that modifies the channel transform so that the channel transform during JRNSO periods differs from the channel transform during data periods.

$G_A=J_{A1}$=a function applied by Alice during her loop back process during a JRNSO period.

$G_A=J_{A2}$=a function applied by Alice during Bob's loop back process during a JRNSO period.

$G_B=J_{B1}$=a function applied by Bob during his loop back process during a JRNSO period.

$G_B=J_{B2}$=a function applied by Bob during Alice's loop back process during a JRNSO period.

$G_A=D_A$=a function applied by Alice during a data period.

$G_B=D_B$=a function applied by Bob during a data period.

Alice 110 initiates her loop back process by applying a function $G_A$ 509 to a private pilot $p_A$ 512 and transmitting the signal $p_A$ 515 to Bob 120 over channel $G_{AB}$ 205, creating a resulting signal $G_{AB}p_A$ 518. Bob 120 receives the signal $G_{AB}p_A$ 518 and translates the signal to baseband. Bob applies a function $G_B$ 521 to the signal and sends the signal $G_{AB}p_A$ 524 back to Alice 110 over a channel with a different frequency $G_{BA}$ 230, creating signal $G_{BA}G_{AB}p_A$ 527. Alice 110 receives the looped back signal $G_{BA}G_{AB}p_A$ 527 completing her JRNSO loop back process.

Bob 120 initiates his loop back process when he applies a function $G_B$ 521 to a private pilot $p_B$ 530 and sends the signal to Alice 110 over channel $G_{BA}$ 230, creating a resulting signal $G_{BA}p_B$ 533. Alice 110 receives the signal $G_{BA}p_B$ 533 and translates the signal to baseband. Alice 110 applies a function $G_A$ 509 and sends the signal $G_{BA}p_B$ 536 back to Bob 120 over a channel with a different frequency $G_{AB}$ 205, creating a resulting signal $G_{AB}G_{BA}p_B$ 539. Bob 120 receives the looped back signal $G_{AB}G_{BA}p$ completing his loop back process.

After the loop back process has been completed for Alice 110 and Bob 120, then Alice 110 has observed $G_{BA}G_{AB}p_A$ 527 and $G_{BA}p_B$ 533; and Bob 120 has observed $G_{AB}p_A$ 518 and $G_{AB}G_{BA}p_B$ 539. While Eve 130 has observed different values during the data periods and JRNSO periods, the functions $G_A$ and $G_B$ effects are indivisible from the overall channel transform. Therefore, Alice 110 and Bob 120, who know their private pilots, are able to calculate their channel transforms. However, Eve 130, is only able to calculate the channel transforms if she synchronizes the four sampling streams to the same corresponding instant. By using different channel modifying transforms, Eve 130 does not observe the same fluctuations in the channels for both data and JRNSO signaling periods. Eve 130 therefore would not determine the same channel information as Alice 110 and Bob 120 even though the actual channel had not significantly deviated during the two time periods. Eve 130 could get around this approach by synchronizing the actual samples from the different measurements and processing these measurements to remove the effects of the private gain functions before statistically determining the channel effect matrices.

In the channel modification example of FIG. 5, the functions $G_A$ and $G_B$ may be applied before amplification, during amplification or after amplification.

FIG. 6 shows an example of a time function diagram where the tc_delay has been minimized as a result of the channel modification process in FIG. 5. A data period 600 is depicted where Alice 110 and Bob 120 transmit signals using a public pilot p 605. A JRNSO period 610 is depicted where Alice 110 and Bob 120 transmit signals using private pilots 615. Delays between the data periods and JRNSO period are depicted at 620, where the delays may be caused by channel switch over, synchronization or settling. The JRNSO period is less than the minimum channel coherence time 625 of either of the channels.

FIG. 7 shows an example of the channel modification process in FIG. 5 where the channel conditions and private pilots are varied according to whether the period is a JRNSO period or a data period. There are two channels depicted: an Alice to Bob channel 700 on one frequency and a Bob to Alice channel 705 on another frequency. There is a JRNSO time period (k) 710. There is a data time period (k−1) 715 which precedes the JRNSO time period (k) 710. There is a data time period (k+1) 720 which occurs subsequent to the JRNSO time period (k) 710.

During the preceding data time period (k−1) 715, Alice 110 and Bob 120 transmit signals $D_{AB}(k-1)p$ 740 and $D_{BA}(k-1)p$ 745, respectively, where p is a public pilot. During the JRNSO time period (k) 710, Alice 110 transmits signals $J_{AB}(k)p_A(k)$ 750 and $J_{AB}(k)J_{BA}(k)p_B(k)$ 755, and Bob 120 transmits signals $J_{BA}(k)p_B(k)$ 760 and $J_{BA}(k)J_{AB}(k)p_A(k)$ 765, where $p_A$ and $p_B$ are private pilots known only to Alice 110 and Bob 120, respectively. During the subsequent data period (k+1) 720, Alice 110 and Bob 120 transmit signals $D_{AB}(k+1)p$ 770 and $D_{BA}(k+1)p$ 775, respectively, where p is a public pilot.

In the example of FIG. 7, the channel conditions are adjusted according to a given situation. For example, the channel values may be maintained at a relatively constant level during each time period to provide robust statistical analysis capabilities. Alternatively, the channel values may be varied within each time period to prevent Eve 130 from obtaining more information than Alice 110 and Bob 120 require for performing their JRNSO determinations. Another alternative is to use the basic functions to pre-process signals or to mitigate known channel variations.

FIG. 8 shows an example of the signaling process in FIG. 5 where channel conditions are varied according to whether the period is a JRNSO period or a data period. In this example, data samples are processed prior to statistical analysis and the end to end channel transforms are set to a perfect channel condition identity. Signals are depicted as functions of conditions which vary according to the channel utilization; where (k) 800 is the condition during the JRNSO period 805, (k−1) 810 is the condition during the data period 815 which precedes the JRNSO period 805, and (k+1) 818 is the condition during the data period 820 which follows the JRNSO period 805. Delays between the data periods 815, 820 and JRNSO period 805 are depicted at 825.

During the data period 815 which precedes the JRNSO period 805, Alice 110 and Bob 120 transmit signals $G_A(k-1)p$ 840 and $G_B(k-1)p$ 845, respectively, where p is a public pilot. During the JRNSO period 805, Alice 110 transmits signals $G_A(k)p_A(k)$ 850 and $G_A(k)G_B(k)p_B(k)$ 855, and Bob 120 transmit signals $G_B(k)p_B(k)$ 860 and $G_B(k)G_A(k)p_A(k)$ 865, where $p_A$ and $p_B$ are private pilots known only to Alice 110 and Bob 120, respectively. During the data period 820 which follows the JRNSO period 805, Alice 110 and Bob 120 transmit signals $G_A(k+1)p$ 870 and $G_B(k+1)p$ 875, respectively, where p is a public pilot.

If Alice 110 and Bob 120 consistently transmit their private pilots concurrent to the transmission start up, and the signal to noise ratio is robust, then a sophisticated Eve 130 may be able to detect the beginning of the sequences and properly align the samples.

FIG. 9 shows an example of the signaling process in FIG. 5 where loop back signals are transmitted according to random time positioning. In this example, the boundaries 900 between the data periods 905 and JRNSO period 910 are masked by using a loop back function. The loop back function introduces a random delay between the time a pilot is received and the time that pilot is transmitted. The random delay is created by introducing false feed back data, referred to here as a false modulation. The false modulation may be introduced before or after completion of Alice's or Bob's respective loop back. If the JRNSO determination period is less than the minimum channel coherence time of either channel, then Eve's ability to calculate the channel transforms is made computationally intensive, although not theoretically impossible.

In this example:

$b_A$=a false modulation inserted by Alice 110 before completion of her loop back process;

$a_A$=a false modulation inserted by Alice 110 after completion of her loop back process;

$b_B$=a false modulation inserted by Bob 120 before completion of his loop back process; and $a_B$=a false modulation inserted by Bob 120 after completion of his loop back process.

As shown in FIG. 9, Alice 110 and Bob 120 may initiate and complete their loop back processes at the same time. In one embodiment, Alice 110 initiates her loop back process by transmitting a signal $J_{AB}p_A$ 915 to Bob 120, and Bob 120 initiates his loop back process by transmitting a signal $J_{BA}p_B$ 935 to Alice 110. Next, Alice 110 introduces a false modulation $b_A$ 920 and Bob 120 introduces a false modulation $b_B$ 940. As shown at 938, Alice 110 and Bob 120 may introduce the false modulations before of after they transmit their respective return signals. Next, Alice 110 receives her looped back signal $J_{BA}J_{AB}p_A$ 925 completing her loop back process, and Bob 120 receives his looped back signal $J_{AB}J_{BA}p_B$ 945 completing his loop back process.

In another embodiment, Alice 110 initiates her loop back process by transmitting a signal $J_{AB}p_A$ 915 to Bob 120, and Bob 120 initiates his loop back process by transmitting a signal $J_{BA}p_B$ 935 to Alice 110. Next, Alice 110 receives her looped back signal $J_{BA}J_{AB}p_A$ 925 and introduces a false modulation $a_A$ 930, and Bob 120 receives his looped back signal $J_{AB}J_{BA}p_B$ 945 and introduces a false modulation as 950. As shown at 948, the loop back process is not complete until after the false modulations $a_A$ 930 and $a_B$ 950 have been introduced.

The above two embodiments may be expanded where Alice 110 and Bob 120 introduce false modulations at random times during the JRNSO period either at the start, end, or interleaved with the actual measurement signaling. If the JRNSO period 910 is less than the minimum coherence time of the channels $G_{AB}$ and $G_{BA}$, then Eve 130, who cannot identify a false modulation from a true JRNSO to data period boundary, cannot synchronize the four data streams and align the samples.

FIG. 10 is an example of a graph depicting the error rate to signal to noise ratio for the channel coder used to exchange information between Alice 110 and Bob 120, to consolidate their similar channel impulse observations into one common observation. This encoding technique is used to exploit Eve's 130 weaker knowledge of the channel between Alice 110 and Bob 120 which translates into an effective weaker signal to noise ratio of the channels observed by Eve 130 of either Alice 110 or Bob 120. This is exploited to exchange information between Alice 110 and Bob 120 and to consolidate the channel observations without revealing the true channel observations to Eve 130. The error rate 1000 (y-axis) is represented as a function 1005 of the signal to noise ratio 1010 (x-axis). As the signal to noise ratio 1010 increases, the error rate 1000 remains relatively constant and then sharply decreases 1020. As depicted, Alice's 110 and Bob's 120 signal to noise ratio 1025 is to the right of the knee of curve 1005 exceeds Eve's 130 signal to noise ratio 1030 which is to the left of the knee of curve 1005. Because the error rate decreases as the signal to noise ratio increases, Alice's 110 and Bob's 120 error rate 1035 is significantly less than Eve's 130 error rate 1040.

To ensure that Eve 130 has a higher error rate, Alice 110 and Bob 120 monitor and control their respective SNR conditions with the goal being to maintain their own respective SNR conditions to lie at the knee of curve 1005 as depicted in FIG. 10.

The channel observation by Eve 130 may be controlled by any combination of adjusting the channel distortion controls or adding noise into the data streams transmitted by Alice 110 or Bob 120. Pseudo-noise may be added into the data streams during signal origination, and during the loop back process. Eve's 130 channel observation may be controlled by Alice 110 or Bob 120 singularly, or by Alice 110 and Bob 120 in combination, and may be expanded to other WTRUs. As shown in FIG. 10, a slight difference between Eve's 130 channel observation and Bob 120/Alice's 110 channel observation may result in a significant difference in the error rate observed by Alice 110 relative to the error rate observed by Eve 130. Thus, Alice 110 and Bob 120 can ensure that Eve 130 has the higher error rate by making only slight adjustments in noise or distortion levels. As a result, Alice 110 and Bob 120 can maintain a quality communication, while limiting Eve's 130 ability to compromise security sensitive information.

FIG. 11 is an example of a JRNSO procedure performed by the system of FIG. 1. In this example, a loop back approach is used in a Time Division Duplex (TDD) mode using private pilots and private gain functions known only to the respective sender, Alice 110 or Bob 120.

The JRNSO process starts when Alice 110 modifies a private pilot $p_A$ 1100 with a private gain function $G_A$ 1103, creating a signal $G_A p_A$ 1106. Then, Alice 110 transmits the signal $G_A p_A$ 1106 to Bob 120 over channel G 1109, creating the resulting signal $GG_A p_A$ 1112. Bob 120 receives the signal $GG_A p_A$ 1112 and translates the signal to baseband. Then, Bob 120 modifies the signal $GG_A p_A$ 1112 with a private gain function $G_B$ 1115, creating a resulting signal $G_B GG_A p_A$ 1118. Bob 120 sends the signal $G_B GG_A p_A$ 1118 back to Alice 110 over the same channel G 1109, which creates a resulting signal $GG_B GG_A p_A$ 1121. Then, Alice 110 receives the looped back signal $GG_B GG_A p_A$ at 1124 completing her loop back process during the JRNSO period.

Bob 120 starts his loop back process when he modifies a private pilot $p_B$ 1130 with a private gain function $G_B$ 1115, creating a signal $G_B p_B$ 1133. Then, Bob 120 transmits the signal $G_B p_B$ 1133 to Alice 110 over channel G 1109, creating the resulting signal $GG_B p_B$ 1136. Alice 110 receives the signal $GG_B p_B$ 1136 and translates the signal to baseband. Then, Alice 110 modifies the signal $GG_B p_B$ 1136 with a private gain function $G_A$ 1103, creating a resulting signal $G_A GG_B p_B$ 1139. Bob 120 sends the signal $G_A GG_B p_B$ 1139 back to Bob 120 over the same channel G 1109, which creates a resulting signal $GG_A GG_B p_B$ 1142. Then, Bob 120 receives the looped back signal $GG_A GG_B p_B$ at 1145 completing his loop back process during the JRNSO period.

During the JRNSO communication between Alice 110 and Bob 120, Eve 130 may monitor Alice's 110 transmitted signals over channel $G_{AE}$ 1151 and Bob's 120 transmitted signals over channel $G_{BE}$ 1154. If Eve 130 is monitoring Alice's 110 transmissions, Eve 130 observes the signals $G_{AE} G_A p_A$ 1157 and $G_{BE} G_B GG_A p_A$ 1160. If Eve 130 is monitoring Bob's 120 transmissions, Eve 130 observes the signals $G_{BE} G_B p_B$ 1163 and $G_{AE} G_A GG_B p_B$ 1166.

After the loop back process has been completed for Alice 110 and Bob 120, then Alice 110 has observed $GG_B GG_A p_A$ 1121 and $GG_B p_B$ 1136; and Bob 120 has observed $GG_A p_A$ 1112 and $GG_A GG_B p_B$ 1142. Because Alice 110 and Bob 120 respectively, know the private pilots and private gain functions they used, Alice 110 can process her looped back signal $GG_B GG_A p_A$ 1121 to determine the channel matrix $GG_B GG_A$. Bob 120 can process his looped back signal $GG_A GG_B p_B$ 1142 to determine the channel matrix $GG_A GG_B$. In this example, Alice 110 and Bob 120 use single-input-single-output (SISO) channels. The channel matrices are Rank 1, degenerate to a single value, and are commutative (e.g. $G_{AB} G_{BA} = G_{BA} G_{AB}$). Using the commutative properties of the channel matrices, Alice 110 and Bob 120 determine essentially identical CIRs.

Eve 130 has observed $G_{AE} G_A p_A$ 1157, $G_{AE} G_A GG_B p_B$ 1166, $GB_E G_B GG_A p_A$ 1160, and $GB_E G_B p_B$ 1163. However, due to the private nature of the pilots in this example, Eve 130 is unable to separate the channel induced scaling, skewing, and rotational effects from the settings inherent to the pilots. Therefore, Eve 130 is unable to determine $G_{BA} G_{AB}$ even if Eve 130 has unlimited computational abilities.

FIG. 12 shows an example of a time function example of the signaling process shown in FIG. 11. There is one reciprocal channel G 1109 over which Alice 110 and Bob 120 transmit and receive signals. There is a time period (k) 1200, which is the minimum required correlation time between Alice 110 and Bob 120. Since both Alice 110 and Bob's 120 measurements are being made sequentially utilizing the same channel, it must remain sufficiently correlated to experience essentially the same channel effects for all of the measurement time periods. The channel effects are scaling, skewing, and rotational changes to the amplitude, frequency, and phase settings inherent to the private pilots. The minimum required correlation time 1200 consists of Alice's 110 JRNSO determination period 1205 and Bob's 120 JRNSO determination period 1210. There is a data period (k−1) 1215 which proceeds the JRNSO period (k) 1200. There is a data period (k+1) 1220 which occurs subsequent to the JRNSO period (k) 1200. All G's are functions of the time periods.

Alice 110 initiates her loop back process by transmitting a signal at 1225 to Bob 120 over channel G 1109, the resulting signal being $GG_A p_A$ 1225, where $p_A$ is a private pilot known only to Alice 110, and $G_A$ is a private gain function known only to Alice 110 and is used to modify $p_A$. Bob 120 then receives the signal, translates the signal to baseband, applies a private gain function $G_B$ known only to Bob 120, converts the signal back to the carrier, and sends the signal back to Alice 110 over the same channel G 1109. Alice 110 then receives the looped back signal $GG_B GG_A p_A$ at 1230, completing her loop back process.

Next, Bob 120 initiates his loop back process by transmitting a signal to Alice 110 over channel G 1109, the resulting signal being $GG_B p_B$ 1235, where G is a function of time, $p_B$ is a private pilot known only to Bob 120, and $G_B$ is a private gain function known only to Bob 120 and is used to modify $p_B$. Alice 110 translates the signal to baseband, applies a private gain function $G_A$ known only to Alice, converts the signal back to the carrier, and sends the signal back to Bob 120 over the same channel G 1109. Bob 120 then receives the looped back signal $GG_A GG_B p_B$ at 1240, completing his loop back process.

In this example, the minimum required correlation time 1200 is achieved when Alice 110 initiates and completes her loop back process, and then Bob 120 initiates and completes his loop back process. Thus, the channels must be correlated after four transmissions are sent. Alice 110 and Bob 120 may reduce the minimum required correlation time by pairing together like transmissions in order to reduce the number of transmissions required to perform channel measurements.

It should be noted that if Eve 130 algebraically processes the samples prior to statistical analysis, then Alice 110 and Bob 120 may use the methods discussed in the FDD section to prevent synchronization, and to exploit their greater signal to noise ratio.

FIG. 13 is a time function example of the signaling process shown in FIG. 11, here showing pilot usage with paired like transmissions. There is one reciprocal channel G 1109 between Alice 110 and Bob 120 over which all signals are transmitted and received. There is a time period (k) 13001300, which represents JRNSO usage of the channel G 1109 between Alice 110 and Bob 120. There are two minimum correlation time periods depicted at 1305 and 1310. There is a data period (k−1) 1315 which proceeds the JRNSO period (k) 1300. There is a data period (k+1) 1320 which occurs subsequent to the JRNSO period (k) 1300. All G's are functions of the time periods.

Pilot sequences are broken into blocks and transmitted by Alice 110 and Bob 120 in alternating succession, called a paired transmission. Similarly, return signals are broken into blocks and transmitted by Alice 110 and Bob 120 in alternating succession, also called a paired transmission. One paired transmission 1305 consists of Alice's 110 pilot transmission, as depicted at 1325, and Bob's 120 pilot transmission, as depicted at 1330. Another paired transmission 1310 consists of Alice's 110 loop back transmission, as depicted at 1335, and Bob's 120 loopback transmission, as depicted at 1340.

Alice 110 starts the process at 1325 by transmitting a signal to Bob 120 over channel G 1109, the resulting signal being $GG_A p_A$, where $p_A$ is a private pilot known only to Alice 110, and $G_A$ is a private gain function known only to Alice 110 and used to modify $p_A$. Then, Bob 120 receives the signal $GG_A p_A$. Then, Bob 120 transmits a different signal to Alice 110 over channel G 1109, the resulting signal being $GG_B p_B$, where $p_B$ is a private pilot known only to Bob 120, and $G_B$ is a private gain function known only to Bob 120 and used to modify $p_B$. Then Alice 110 receives the signal $GG_B p_B$. To this point, there have been two transmissions: one pilot transmission by Alice 110, and one pilot transmission by Bob 120.

Bob 120 then transmits Alice's 110 return signal to Alice 110 multiplied by his private gain function $G_B$. Alice 110 then receives her looped back signal. Then Alice 110 transmits Bob's 120 looped back signal to Bob 120 multiplied by his private gain function $G_A$ and Bob 120 receives the signal. At this point, there have been a total of four transmissions: two by Alice 110 and two by Bob 120.

In summary, this approach has the outbound initial transmission from each terminus sequentially performed first, and the received signals stored at the loop back terminus. The loop back terminuses then sequentially take their stored baseband signals, multiply them by their own private gain function and send them back to the initiators. Since each knows the private pilot they initially sent, they determine the associated matrix product: $GG_B GG_A$ for Alice and $GG_A GG_B$ for Bob.

Thus, as demonstrated by the example in FIG. 13, pairing transmissions types in TDD mode significantly reduces the channel correlation time for Alice 110 and Bob 120 to make their measurement.

In the example of FIG. 13, the paired transmissions may be identity matrices or complex matrices which vary as a function of time. More complex matrices generally result in greater JRNSO security. Additionally, Alice 110 and Bob 120 may use non-identity values for the private gain functions during the data periods to hide the JRNSO period values. The non-identity values may be derived by pre-processing the data streams to compensate for measured channel distortions.

Figure 14:
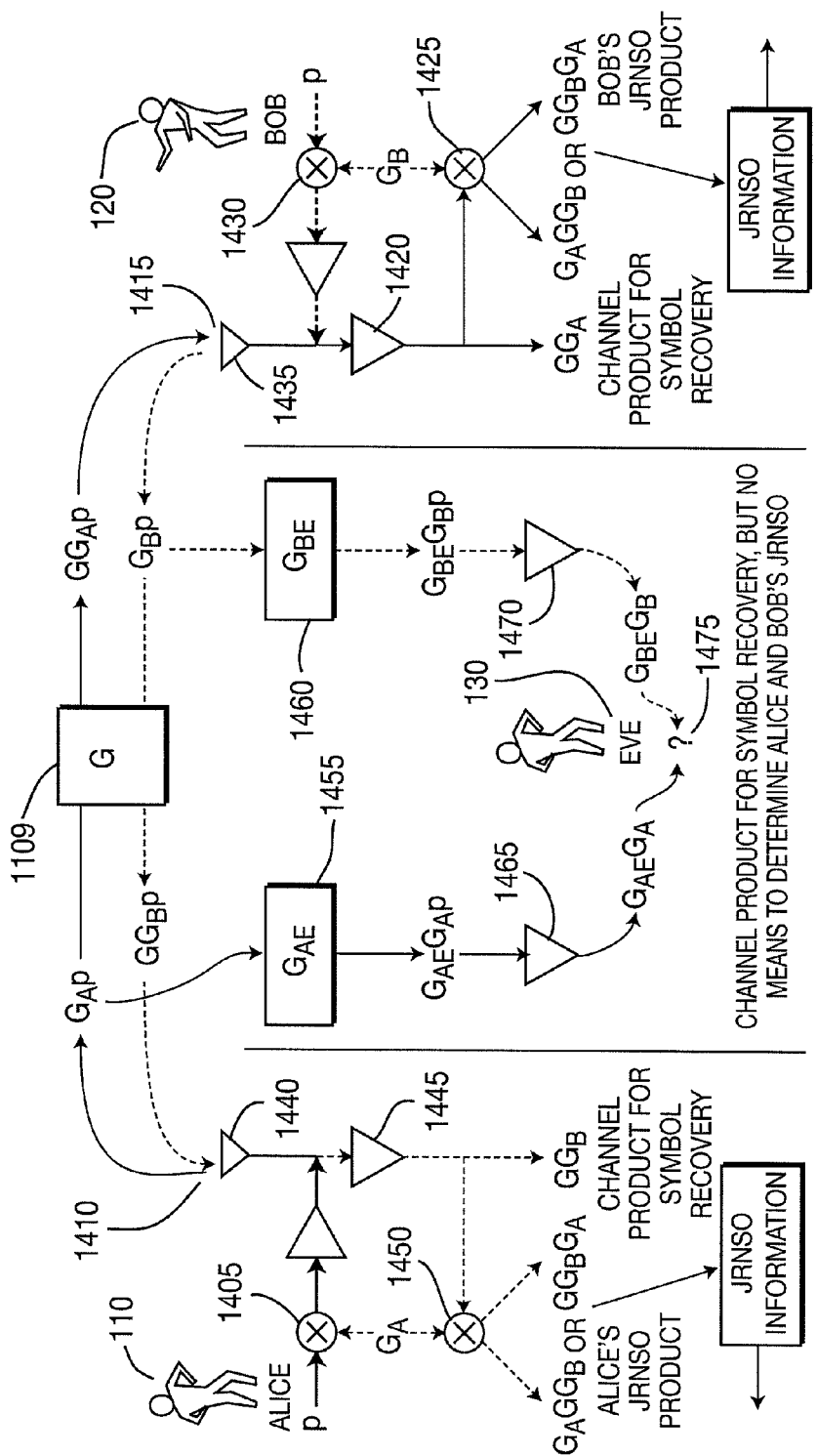
FIG. 14 shows an example of a JRNSO signal process during a pilot period in TDD.

FIG. 14 shows an example of signal flow during a pilot period in TDD mode using public pilots and private gain functions. In this example, private pilots are not used and there is no looped back signal. There is one channel G 1109 over which Alice 110 and Bob 120 transmit and receive signals.

If Alice 110 is the transmitting terminus, then at 1405, Alice 110 modifies a public pilot p with a private gain function $G_A$, where $G_A$ is known only to Alice 110. At 1410, Alice 110 transmits the signal $G_A p$ over channel G 1109 to Bob 120, creating the resulting signal $GG_A p$. At 1415, Bob 120 receives the signal $GG_A p$, translates the signal to baseband at 1420, and multiplies the baseband signal with a private gain function $G_B$ at 1425, where $G_B$ is known only to Bob 120. Assuming derivation of the channel product is order insensitive (e.g. SISO and therefore commutative), Bob 120 may multiply the signal with the private gain function $G_B$ before or after Bob 120 determines the channel matrix product. If Bob 120 determines the channel product $GG_A$ first, then multiplies that product by his private gain function $G_B$, the resulting matrix is $G_B GG_A$. If Bob 120 applies his gain function $G_B$ first, then determines the channel product, the resulting matrix is $GG_A G_B$. Under either scenario, Bob 120 uses the channel product $GG_A$ for symbol recovery and the channel products, $G_B GG_A$ or $GG_A G_B$, for JRNSO information.

If Bob 120 is the transmitter, then at 1430, Bob 120 modifies a public pilot p with a private gain function $G_B$, where $G_B$ is known only to Bob 120. At 1435, Bob 120 transmits the signal $G_B p$ over channel G 1109 to Alice 110, creating the resulting signal $GG_B p$. At 1440, Alice 110 receives the signal $GG_A p$, translates the signal to baseband at 1445, and multiplies the baseband signal with a private gain function $G_A$ at 1450, where $G_B$ is known only to Alice 110. Assuming derivation of the channel product is order insensitive (e.g. SISO and therefore commutative), Alice 110 may multiply the signal with the private gain function $G_B$ before or after Alice 110 determines the channel matrix product. If Alice 110 determines the channel product $GG_B$ first, then multiplies that product by her private gain function $G_A$, the resulting matrix is $G_A GG_B$. If Alice 110 applies her gain function $G_A$ first, then determines the channel product, the resulting matrix is $GG_A G_B$. Under either scenario, Alice 110 uses the channel product $GG_B$ for symbol recovery and the channel products, $G_A GG_B$ or $GG_B G_A$, for JRNSO information.

During the communication, Eve 130 may monitor Alice's 110 transmission over channel $G_{AE}$ 1455 and Bob's 120 transmission over channel $G_{BE}$ 1460. If Eve 130 is monitoring Alice's 110 transmission, Eve 130 observes $G_{AE} G_A p$. If Eve 130 is monitoring Bob's 120 transmission, Eve 130 observes $G_{BE} G_B p$. Because Eve 130 knows the public pilot p, Eve 130 may process the observed signals at 1465, 1470 to determine the channel products $G_{AE} G_A$ and $G_{BE} G_B$. While Eve 130 may use the channel products for symbol recovery, Eve 130 does not know the private functions $G_A$ and $G_B$. Therefore, Eve 130 is unable to determine Alice's 110 and Bob's 120 JRNSO information.

In the example of FIG. 14, the same private gain function values used during the JRNSO period may also be used during the data period. The channel and private gain products derived from the pilots can be used for data processing.

Figure 15:
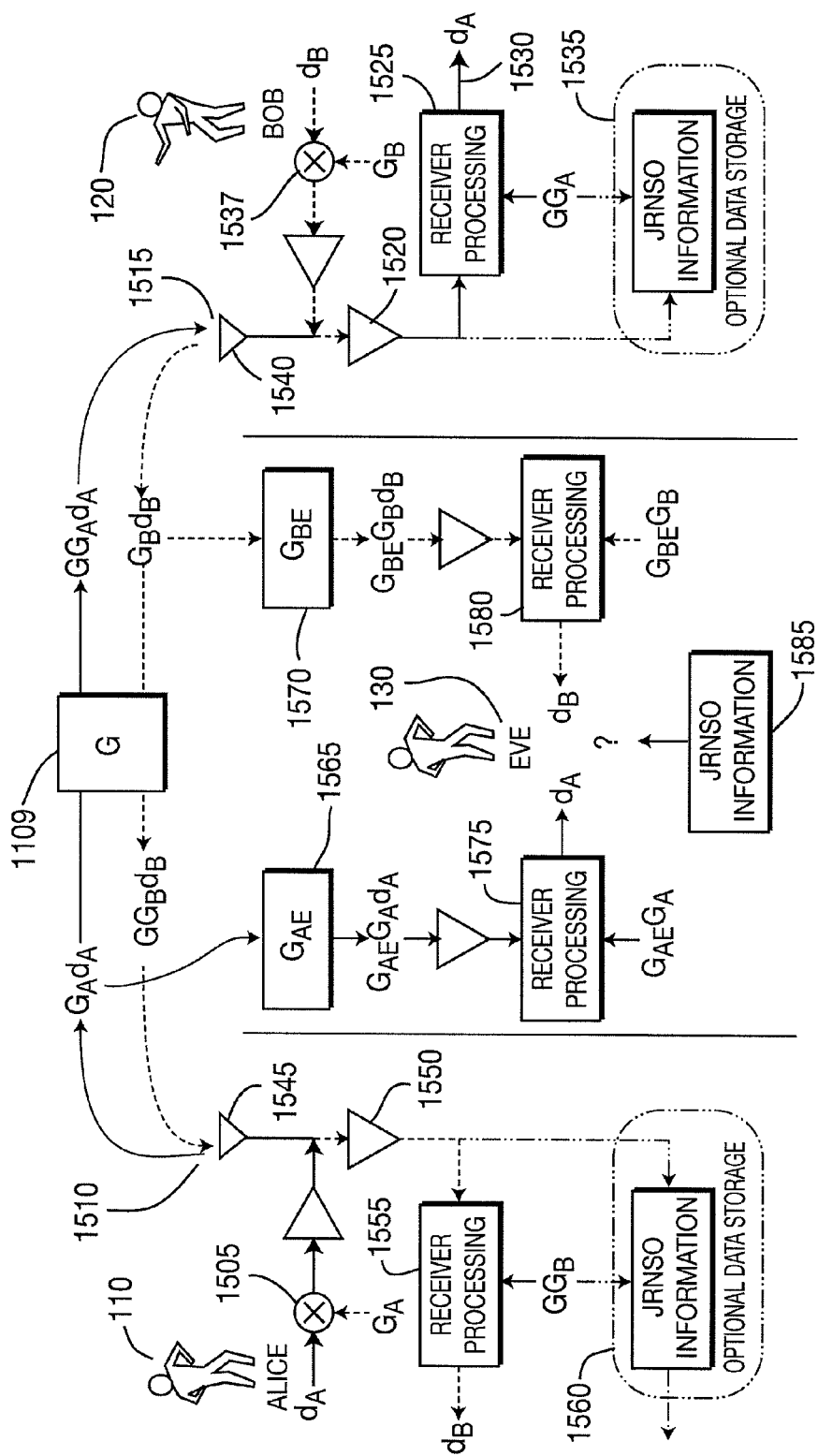
FIG. 15 shows an example of a JRNSO signal process during a data period in TDD.

FIG. 15 shows an example of signal flow during a data period in TDD mode using public pilots and private gain functions. There is one channel G 1109 over which Alice 110 and Bob 120 transmit and receive signals.

If Alice 110 is transmitting, then at 1505, Alice 110 multiplies a data symbol $d_A$ with a private gain function $G_A$, where $G_A$ is known only to Alice 110. At 1510, Alice 110 sends the signal $G_A d_A$ over channel G 1109 to Bob 120, creating the resulting signal $GG_A d_A$. Bob 120 receives the signal $GG_A d_A$ at 1515. At 1520, Bob 120 processes the signal to baseband. At 1525, Bob 120 further processes the signal and extracts $d_A$ and $GG_A$, where $d_A$ is used as data 1530, and $GG_A$ is stored for optional JRNSO use 1535.

If Bob 120 is transmitting, then at 1537, Bob 120 multiplies a data symbol $d_B$ with a private gain function $G_B$, where $G_B$ is known only to Bob 120. At 1540, Bob 120 sends the signal $G_B d_B$ over channel G 1109 to Alice 110, creating the resulting signal $GG_B D_B$. Alice 110 receives the signal $GG_B D_B$ at 1545. At 1550, Alice 110 processes the signal to baseband. At 1555, Alice 110 further processes the signal and extracts $d_B$ and $GG_B$, where $d_B$ is used as data, and $GG_B$ is stored for optional JRNSO use.

Figure 16:
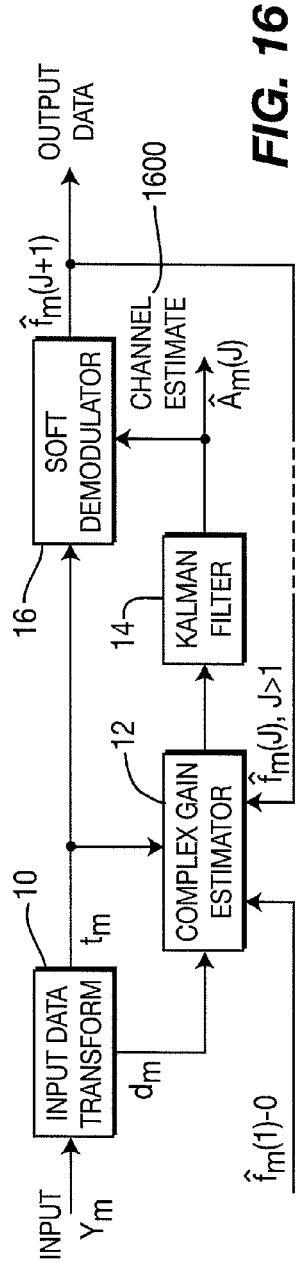
FIG. 16 shows an example of a Kalman filter.

Eve 130 may monitor Alice's 110 transmissions over channel $G_{AE}$ 1565, and Bob's 120 transmissions over channel $G_{BE}$ 1570. If Eve 130 monitors Alice's 110 transmission, Eve 130 observes $G_{AE} G_A d_A$. At 1575, Eve 130 may further process Alice's signal to extract $d_A$ and $G_{AE} G_A$. If Eve 130 monitors Bob's 120 transmission, Eve 130 observes $G_{BE} G_B d_B$. At 1580, Eve 130 further processes Bob's 120 signal to extract $d_B$ and $G_{BE} G_B$. However, because Eve 130 does not know the private gain functions $G_A$ and $G_B$, Eve 130 is unable to determine the JRNSO information, as shown at 1585. FIG. 16 shows an example of a Kalman filter using pilots and data to decode symbols. The channel estimate 1600 is a value set, or subset, recorded at the end of each channel pairing measurement period.

Figure 17:
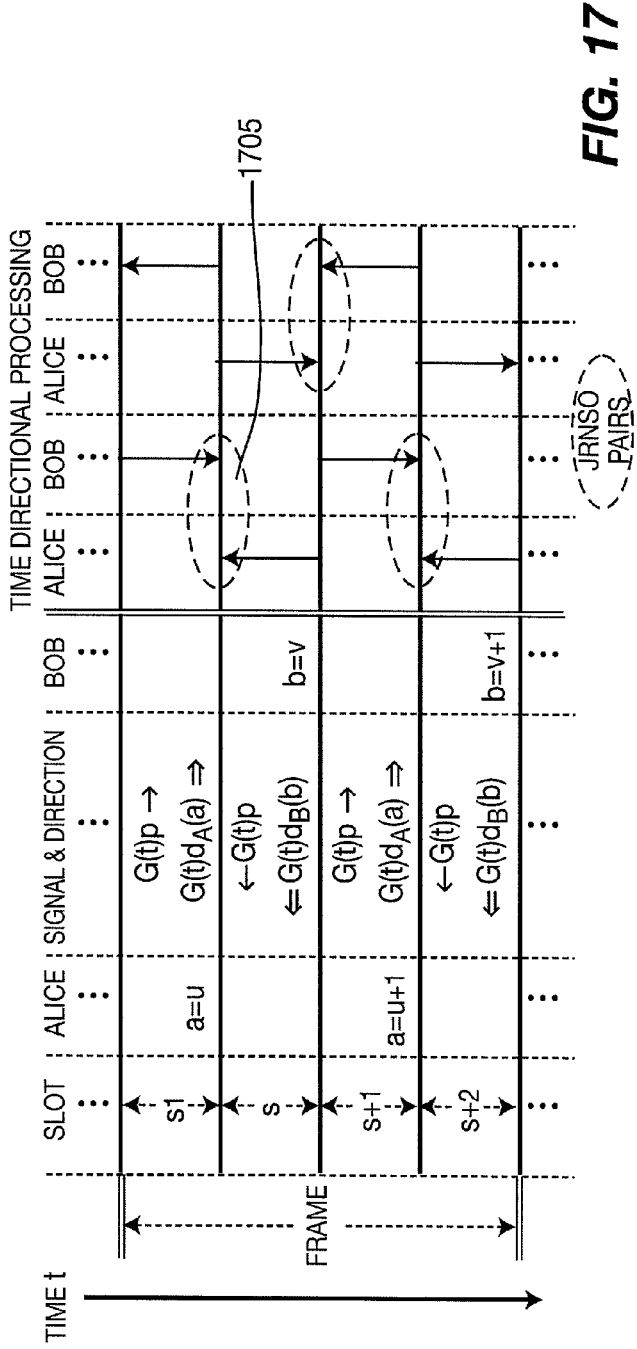
FIG. 17 shows an example of Kalman filtering directional processing.

FIG. 17 shows an example of Kalman filtering time directional processing. Data is processed in reverse time order to improve comparison of mutually determined value sets. Alice 110 uses the values 1600 to determine JRNSO information corresponding to Bob's 120 paired measurement, and vice versa. Optimally, the Alice 110 and Bob 120 process the Kalman filter output as close as possible to the transition boundary between the JRNSO periods and the data periods. As shown at 1705, Alice 110 and Bob 120 process the same data in both the forward and reverse time direction. The reverse time seeding is the last channel set which is calculated from the forward time calculation. Optimally, the symbols in the forward direction are exploited in the reverse direction. Alternatively, the seeding is derived from the prior measurement period if forward time processing is not required in the present time period. The prior measurement period in the latter example could be forward or reverse in time.

Alternatively, Alice's 110 and Bob's 120 statistical determination of the channel information is biased toward the JRNSO period-data period transition boundary using sliding windows or weighted samples.

It should be noted that for simplicity, the above embodiments were described in single-input-single-output (SISO) or single-input-multiple-output SIMO) mode. In fact, the JRNSO applications in FDD and TDD may also be used in multiple-input-multiple-out (MIMO) or multiple-input-single-output (MISO) modes. The following MIMO embodiments are described where Alice 110 and Bob 120 each have two antenna elements. In fact, Alice 110 and Bob 120 may have more than two antenna elements. Additionally, Alice 110 and Bob 120 may have different numbers of antenna elements. Array couplings, dimensional antenna patterns or polarizations may be used in place of distinct antenna elements. Optimally, channel paths between Alice 110 and Bob 120 are used in parallel during the propagation time periods so that each loop back channel pair is measured as close in time as possible. Alternatively, channel paths between Alice 110 and Bob 120 are used sequentially during the propagation periods to reduce the effects of interference. Optimally, Alice 110 and Bob 120 use the minimum number of antenna elements required to protect JRNSO secrecy.

Figure 18:
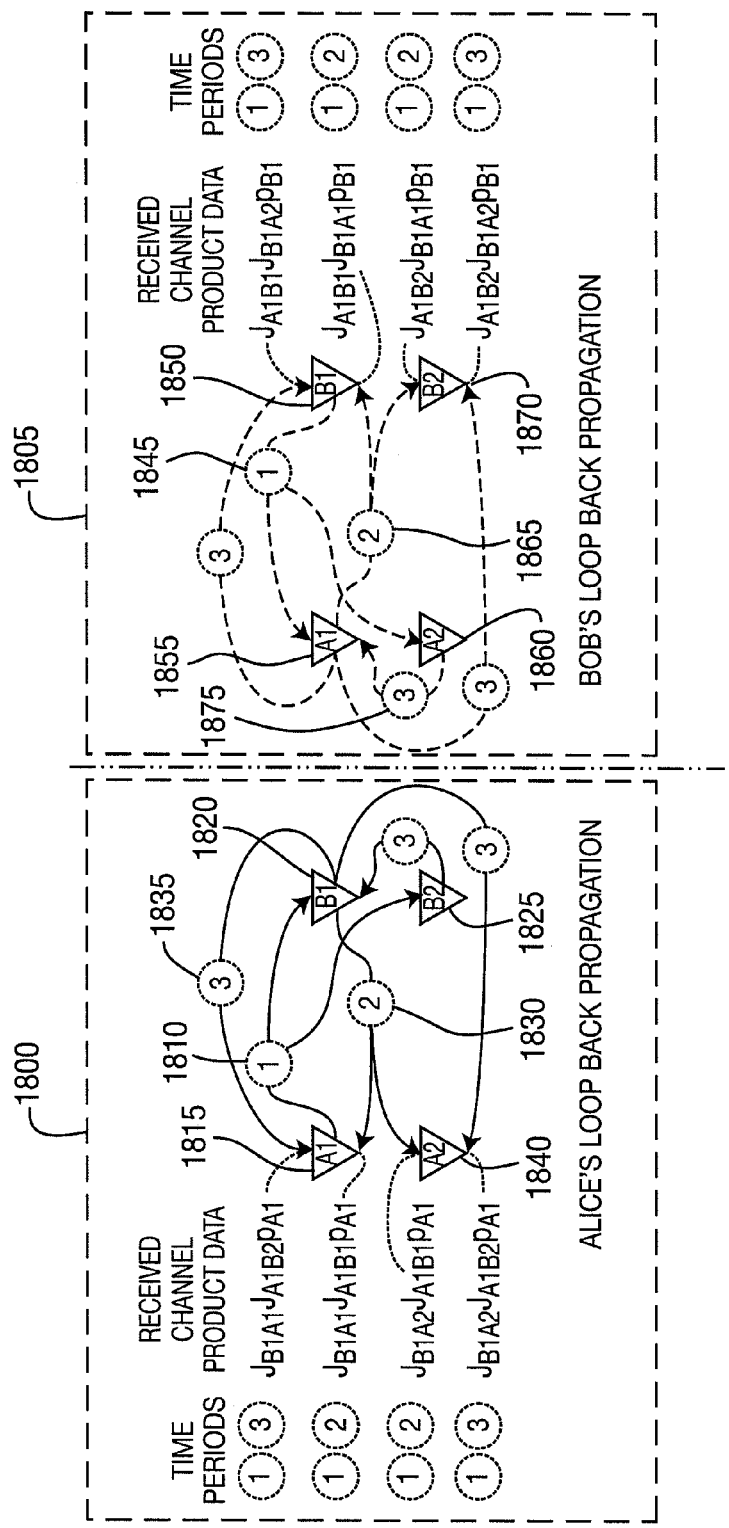
FIG. 18 shows an example of a JRNSO signal process in MIMO.

FIG. 18 is an example of a block diagram showing a loop back signal flow using the fewest time periods for MIMO RF networks. Signal flow during Alice's 110 loop back cycle is shown at 1800. Signal flow during Bob's 120 loop back cycle is shown at 1805. There are three time periods shown for Alice's 110 loop back process and three time periods shown for Bob's 120 loop back process. Time periods are depicted in pairs. Initial transmissions (primary) are sent at time period 1. Looped back signals are transmitted at time periods 2 and 3. If Alice 110 is the initial transmitter, Alice 110 transmits a signal from one antenna element, Bob 120 receives the signal over two antenna elements, then Bob 120 returns two signals to Alice 110 sequentially from one antenna element. Alice 110 then receives the looped back signal over two antenna elements.

For Alice's 110 loop back process 1800, at time period 1 1810, Alice 110 transmits a pilot signal from antenna element A1 1815 and Bob 120 receives the signal over antenna elements B1 1820 and B2 1825. At time period 2 1930, Bob 120 sends a return signal from antenna element B1 1820 and Alice 110 receives the looped back signal over antenna elements A1 1815 and A2 1840. At time period 3 1835, Bob 120 transmits a signal from antenna element B2 1825 to antenna element B1 1820, and then transmits the signal from antenna element B1 1820 to Alice 110. Still shown at time period 3 1835, Alice 110 receives the looped back signal over antenna elements A1 1815 and A2 1840. Alice 110 receives no looped back signals directly from Bob's 120 antenna element B2 1825.

For Bob's 120 loop back process 1805, at time period 1 1845, Bob 120 transmits a pilot signal from antenna element B1 1850 and Alice 110 receives the signal over antenna elements A1 1855 and A2 1860. At time period 2 1865, Alice 110 sends a return signal from antenna element A1 1855 and Bob 120 receives the looped back signal over antenna elements B1 1850 and B2 1870. At time period 3 1875, Alice 110 transmits a signal from antenna element A2 1860 to antenna element A1 1855, and then transmits the signal from antenna element A1 1855 to Alice 110. Still shown at time period 3 1875, Bob 120 receives the looped back signal over antenna elements B1 1850 and B2 1870. Bob 120 receives no looped back signals directly from Alice's 110 antenna element A2 1860.

After Alice 110 has completed her loop back process 1800, Alice 110 has observed two signals over antenna element A1 1815: one signal $J_{B1A1}J_{A1B1}p_{A1}$ during time period 2 1830, and another signal $J_{B1A1}J_{A1B2}p_{A1}$ during time period 3 1835. Alice 110 has also observed two signals over antenna element A2 1940: one signal $J_{B1A2}J_{A1B1}p_{A1}$ during time period 2 and another signal $J_{B1A2}J_{A1B2}p_{A1}$ during time period 3.

After Bob 120 has completed his loop back process, Bob 120 has observed two signals over antenna element B1 1945: one signal $J_{A1B1}J_{B1A1}p_{B1}$ during time period 2, and another signal $J_{A1B1}J_{B1A2}p_{B1}$. Bob 120 has also observed two signals over antenna element B2 1950: one signal $J_{A1B2}J_{B1A1}p_{B1}$ during time period 2, and another signal $J_{A1B2}J_{B1A2}p_{B1}$ during time period 3.

As shown in FIG. 18, after both Alice 110 and Bob 120 have completed their loop back cycles, Alice 110 and Bob 120 may correlate their observed channel products to determine essentially the same CIR.

In one embodiment, a non-SIMO or non-SISO array is reduced to SISO by using one antenna at each terminus, where the antenna elements used during each successive loop back are identical.

In another embodiment, a non-SIMO or non-SISO case is reduced to multiple instances of SISO or SIMO in order to increase the amount of available CIR information. Signals are transmitted from a single antenna element but received at multiple receive antenna elements. In this embodiment, the receiving terminus activates its antenna elements sequentially when transmitting the loop back signals. The antenna elements used in each loop back cycle are identically paired so that Alice 110 and Bob 120 may determine essentially the same CIR.

In another embodiment, MIMO is reduced to SIMO. At the transmitting terminus, one transmitting antenna element is activated to send signals. At the receiving terminus, signals are received over multiple antenna elements. The receiving terminus then sends the return signals back. The return signals are received and decoded by the same transmission element. The process is repeated at each terminus so that Alice 110 and Bob 120 are analyzing essentially identical commutative channel products.

Figure 19:
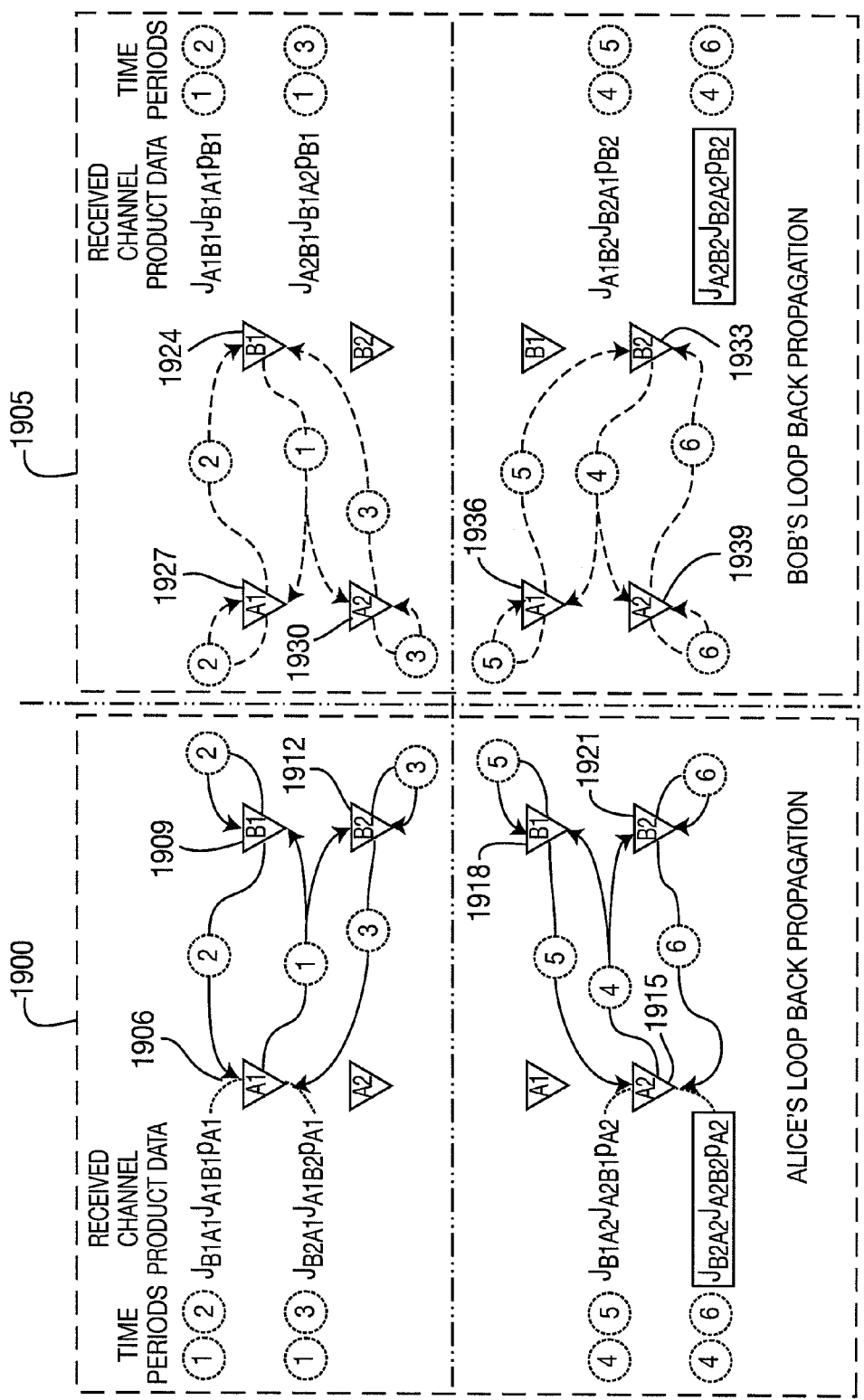
FIG. 19 shows an example of a JRNSO signal process in MIMO.

FIG. 19 is an example of block diagram showing a loop back signal flow using all unique signaling path segments in MIMO RF networks. Signal flow during Alice's 110 loop back process is depicted at 1900. Signal flow during Bob's 120 loop back process is depicted at 1903. There are six time periods depicted for Alice's 110 loop back process and six time periods depicted for Bob's 120 loop back process. Time periods are depicted in pairs. Initial transmissions (primary) are sent at time period 1 and time period 4. Looped back signals are transmitted at time periods 2, 3, 5 and 6.

For Alice's 110 loop back process 1900, at time period 1, Alice 110 transmits a pilot signal from antenna element A1 1906 and Bob 120 receives the signal over antenna elements B1 1909 and B2 1912. At time period 2, Bob 120 sends a return signal from antenna element B1 1909 and Alice 110 receives the looped back signal over antenna element A1 1906. At time period 3, Bob 120 transmits a return signal from antenna element B2 1912 and Alice 110 receives the looped back signal over antenna element A1 1906. At time period 4, Alice 110 transmits a pilot signal from antenna element A2 1915 and Bob 120 receives the signal over antenna elements B1 1918 and B2 1921. At time period 5, Bobs 120 sends a return signal from antenna element B1 1918 and Alice 110 receives the looped back signal at antenna element A2 1915. At time period 6, Bob 120 sends a return signal from antenna element B2 1921 and Alice 110 receives the looped back signal over antenna element A2 2015.

For Bob's 120 loop back process, at time period 1, Bob 120 transmits a pilot signal from antenna element B1 1924 and Alice 110 receives the signal over antenna elements A1 1927 and B2 1930. At time period 2, Alice 110 sends a return signal from antenna element A1 1927 and Bob 120 receives the looped back signal over antenna element B1 1924. At time period 3, Alice 110 transmits a return signal from antenna element A2 1930 and Bob 120 receives the looped back signal over antenna element B1 1924. At time period 4, Bob 120 transmits a pilot signal from antenna element B2 1933 and Alice 110 receives the signal over antenna elements A1 1936 and A2 1939. At time period 5, Alice 110 sends a return signal from antenna element A1 1936 and Bob 120 receives the looped back signal at antenna element B2 1933. At time period 6, Alice 110 sends a return signal from antenna element A2 1939 and Bob 120 receives the looped back signal over antenna element B2 1933.

After Bob and Alice complete their loop back cycles, they may correlate their received channel product data as shown in FIG. 19.

FIG. 20 is a table showing all possible propagation products where Alice 110 and Bob 120 each have two antenna elements. Alice's 110 antenna elements are designated A1 and A2. Bob's 120 antenna elements are designated B1 and B2. Primary transmissions are shown by reference 1 (A1 and B1) and reference 6 (A2 and B2). Loop back transmissions of the primary signal of reference 1 are shown at references 2, 3, 4, and 5. Loop back transmissions of the primary signal of reference 6 are shown by references 7, 8, 9, and 10. As shown in FIG. 20, there are thirty-two propagation products of the looped back signals in a 2×2 MIMO configuration. After Alice 110 and Bob 120 complete their loop back process, Alice 110 has observed sixteen propagation products, and Bob 120 has observed sixteen propagation products. As shown, Alice 110 can correlate her sixteen propagation products with Bob's sixteen propagation products.

Figures 21, 23:
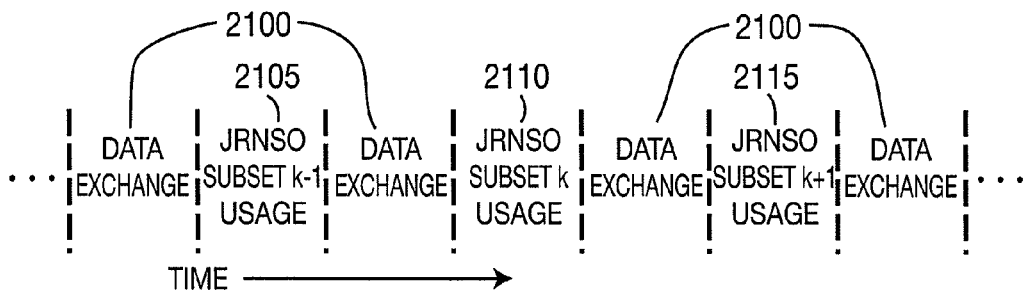
FIG. 21 shows an example of JRNSO measurements as a function of time.
FIG. 23 shows an example of derivable products using square matrix transmission sequences in FDD.

FIG. 21 is a time function example of JRNSO subset measurement usage in MIMO RF networks. Time increases from left to right. As demonstrated, data exchange periods alternate with JRNSO periods. The JRNSO periods are designated as JRNSO subset usage (k−1) 2105, JNSRO subset usage (k) 2110, and JRNSO subset usage (k+1) 2115.

Figure 22:
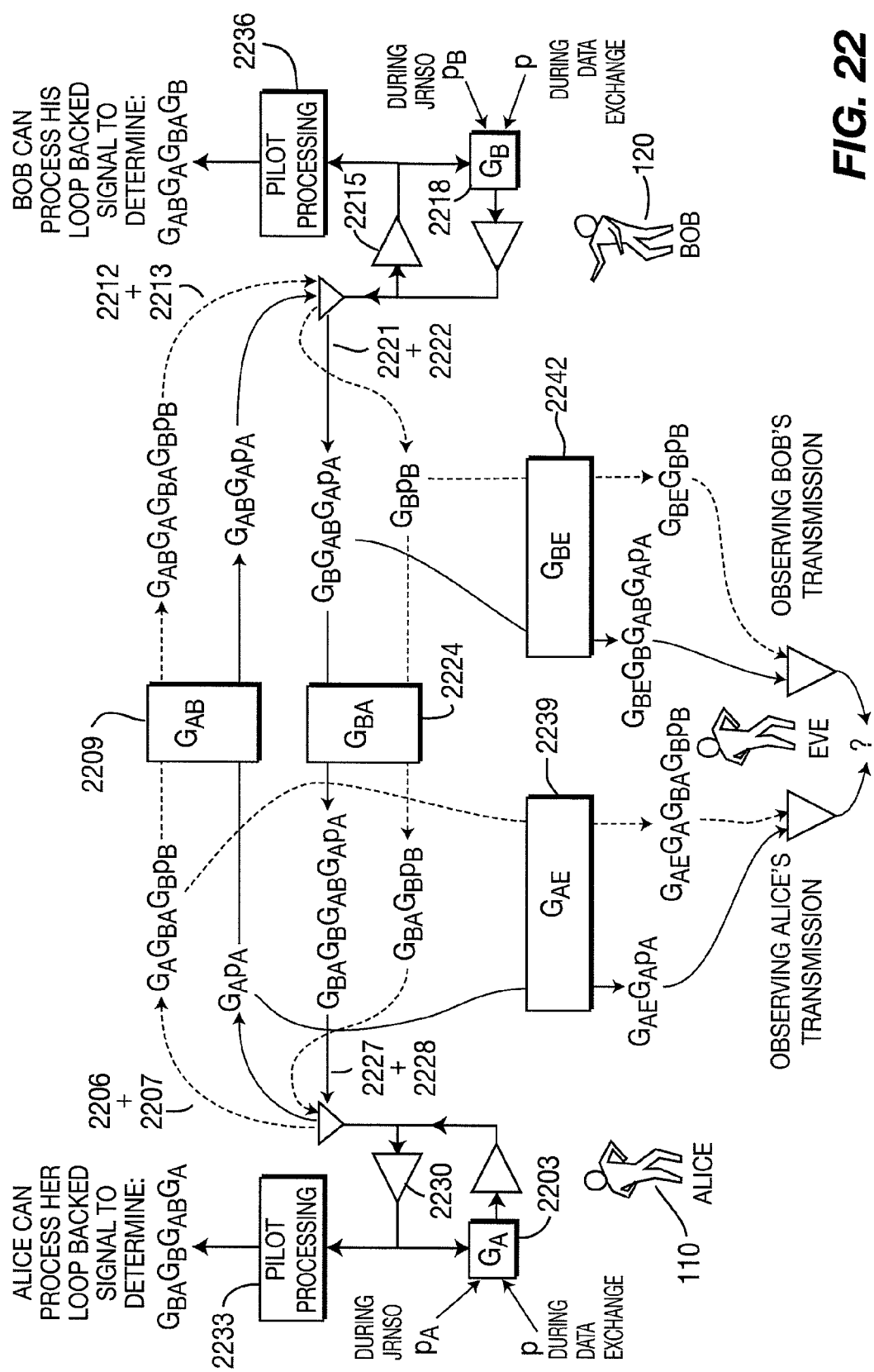
FIG. 22 is shows an example of a JRNSO procedure in MIMO using a loop back approach with public pilots and private gain functions.

FIG. 22 is an example of a block diagram showing signal flow in FDD MIMO mode using private pilots and private gain functions. Symmetric functions of MIMO products are used to calculate channel transforms.

Alice's 120 loop back process begins at 2203 when Alice 110 multiplies a private pilot $p_A$ with a gain function $G_A$, where $p_A$ and $G_A$ are known only to Alice At 2206, Alice 110 transmits the signal $G_A p_A$ over channel $G_{AB}$ 2209 to Bob 120, creating the resulting signal $G_{AB} G_A p_A$. Bob 120 receives the signal at 2212, translates the signal to baseband at 2215, multiplies the signal with gain function $G_B$ at 2218, and at 2221, transmits the signal over a channel with a different frequency $G_{BA}$ 2224, creating resulting signal $G_{BA} G_B G_{AB} G_A p_A$. At 2227, Alice receives the signal $G_{BA} G_B G_{AB} G_A p_A$.

Bob's 120 loop back process begins at 2218 when Bob 120 multiplies a private pilot $p_B$ with a gain function $G_B$, where $p_B$ and $G_B$ are known only to Bob 120. At 2222, Bob 120 transmits the signal $G_B p_B$ over channel $G_{BA}$ 2224 to Alice 110, creating the resulting signal $G_{BA}G_B p_B$. Alice 110 receives the signal at 2228, translates the signal to baseband at 2230, multiplies the signal with gain function $G_A$ at 2203, and at 2207, transmits the signal over a channel with a different frequency $G_{AB}$ 2209, creating the resulting signal $G_{AB}G_A G_{BA}G_B p_B$. At 2213, Bob 120 receives the signal $G_{AB}G_A G_{BA}G_B p_B$.

After Alice 110 has completed her loop back process, Alice 110 has observed $G_{BA}G_B G_{AB}G_A p_A$. At 2233, Alice 110 processes her private pilot $p_A$ to determine $G_{BA}G_B G_{AB}G_A$. After Bob 120 has completed his loop back process, Bob 120 has observed $G_{AB}G_A G_{BA}p_B$. At 2236, Bob 120 processes his private pilot $p_B$ to determine $G_{AB}G_A G_{BA}G_B$.

Eve 130 may monitor Alice's 110 transmissions over channel $G_{AE}$ 2239 and Bob's 120 transmissions over channel $G_{BE}$ 2242. If Eve 130 is monitoring Alice's 110 transmission, Eve 130 observes $G_{AE}G_A p_A$ and $G_{AE}G_A G_{BA}G_B p_B$. If Eve 130 is monitoring Bob's 120 transmissions, Eve 130 observes $G_{BE} G_B p_B$ and $G_{BE}G_B G_{AB}G_A p_A$. However, because Eve 130 does not know the private pilots $p_A$ and $p_B$, Eve 130 cannot calculate the channel transforms.

As further shown in the loop back example of FIG. 22, the channel transforms used during the JRNSO periods differ from the channel transforms used during the data periods. This is necessary because Eve 130 can use the public pilot p to determine the channel transforms during the data periods. In one embodiment, Eve 130 is prevented from determining the channel transforms during the JRNSO period by making the switch over time between data and JRNSO periods exceed the maximum coherence time of the channels. The same concepts described previously for SISO may be utilized in this scenario. Alternatively, the end to end channel transforms are modified so that Eve cannot separate the channel modification effects from the natural channel effects.

In the MIMO loop back example of FIG. 22, the channel transforms are not commutative. However, instead of reducing MIMO cases to SISO or SIMO to derive JRSNO information from the CIR matrices, JRNSO may be derived from special functions of the channel product matrices. These may be applied to any MIMO or SISO case. In this embodiment symmetric functions, which determine results which are independent of the order of channel operations are utilized. The determinant and the trace of a matrix are examples of such functions. However, many other symmetric functions of matrices exist. Mathematically, the property of determinants being exploited is described as, $\det(J_{BA}J_{AB}) = \det(J_{AB})\det(J_{BA})$, where each entry in the matrices is singularly valued. Thus, the determinants are singularly valued and commutative, so that $\det(J_{BA}J_{AB}) = \det(J_{AB})\det(J_{BA}) = \det(J_{BA})(J_{AB}) = \det(J_{AB}J_{BA})$, where an N×N function, which contains N independent shared values that Alice 110 and Bob 120 can use to derive a common shared key, is converted into a single value.

For a general definition of a symmetric function, let $X_1, \ldots, X_N$ be a set of N arguments which is potentially matrix-valued. Then, a function $f(X_1, \ldots, X_N)$ is symmetric if it is invariant to the permutation of its arguments.

For example p: $[1, \ldots, N] \square [1, \ldots N]$ is a permutation on the set $[1, \ldots, N]$. Thus, a function f is symmetric for any such p if $f(X_{p(1)}, \ldots X_{p(N)}) = f(X_1, \ldots X_N)$.

For processing the asymmetric round-trip matrices resulting in the MIMO and SISO cases, a specific family of symmetric functions known as Symmetric principal Minor Sums (SpMSs) is used.

Let I, J, be k-element subsets of $[1, \ldots N]$. For an N×N matrix X, then $X_{I,J} = \{x_{i,j} \in X : i \in I, j \in J\}$ where $X_{I,J}$ is a k×k matrix whose elements are selected using the index sets I and J. The [I, J]-minor of X is the determinant of $X_{I,J}$, denoted by $[X]_{I,J}$ A minor is a principal minor if I=J. The minors satisfy the following property $$[AB]_{I,J} = \sum_K [A]_{I,K}[B]_{K,J}$$

where the sum is taken over all possible k-element subsets of $[1, \ldots, N]$ (denoted by K).

For an N×N matrix X, define N+1 elementary SpMSs (eSpMSs) as follows:

$S_0(X) = 1.$

For $1 \leq n \leq N$ $$S_n(X) = \sum_I [X]_{I,I}$$

where the sum is taken over all n-element subsets of $[1, \ldots, N]$. Such sums are symmetric in the matrix product, as demonstrated by $$S_n(AB) = \sum_I [AB]_{I,I} = $$
$$\sum_I \sum_K [A]_{I,K}[B]_{K,I} = \sum_K \sum_I [B]_{K,I}[A]_{I,K} = \sum_K [BA]_{K,K} = S_n(BA)$$

where the third equality follows by commuting the outer sums and the inner product.

The eSpMS functions form a "baseline set" for generating more complex symmetric functions of minors. For example, any products or linear combinations which are polynomials of eSpMSs are symmetric functions of matrix products.

Additionally, the eSpMS functions are related to the eigenvalues of their argument matrices. For example, let $\square 1, \ldots, \square n$ be the N eigenvalues of the N×N matrix X. Then, $$S_n(X) = \sum_{1 \leq i_1 < \ldots < i_n \leq N} \lambda_{i_1} \times \ldots \times \lambda_{i_n}$$

where the polynomials of eigenvalues on the right-hand side are the well known elementary symmetric polynomials in N variables, defined by $$E_{N,n}(x_1, \ldots, x_n) = \sum_{1 \leq i_1 < \ldots < i_n \leq N} x_{i_1} \times \ldots \times x_{i_n}$$

Therefore, the elementary symmetric polynomials of eigenvalues of matrix products are invariant to the order in which matrices are multiplied, even through the eigenvalues or their products are not invariant to the order of multiplication.

Note that the determinant of an N×N matrix X is just $S_N(X)$ and the trace N×N matrix X is just $S_1(X)$. Therefore, SpMSs represent a generalization of the notion of a matrix determinant and trace. The relationship is established either from the minor-based definition of SpSMs or the alternative, eigenvalue based definition.

In one embodiment, SpMS are computed based on the computation of principal minors. Convergence is guaranteed but computation of principal minors may be complex.

In another embodiment, SpMS are computed based on eigenvalues. Eigenvalues are calculated in iterations which does not guarantee convergence. Therefore, eigenvalues are computed using low complexity approximations.

In another embodiment, symmetric functions are determined using square matrices where Alice 110 and Bob 120 have an unequal number of input and output streams. A subset which has equal dimensions is selected for each JRNSO transmission and loop back. To increase the amount of mutually available JRNSO information, each unique square subset is used.

FIG. 23 is a table showing sample square transmission sequences. Signaling products with like terms are used to derive square matrices. The square matrices have symmetric functions which are equal within the noise and variance limits over the measurement periods. Subscripts indicate which transceiver element is being used. No subscripts indicate that all transceiver elements are being used. Each path is used at least once to exhaust the available channel information and exploit the loop back products. Matrix row entries once used are not re-utilized. Alternatively, where the channels lack orthogonal characteristics, Alice 110 and Bob 120 transmit signals over five time periods using time as an orthogonalizing factor. The numbering of antenna elements is arbitrary and changes the phase of eSpMS but not their absolute value.

It should be noted that Alice 110 and Bob 120 may protect their security even if it appears they are having legitimate communication with Eve 130. During the communication with Eve 130, Alice 110 and Bob 120 use unique private gain functions. Alice 110 and Bob 120 continue to use unique private gain functions in communication with any other terminus.

In situations where Alice 110 and Bob experience significant loop back power loss, Alice 110 and Bob 120 may amplify the primary signal with a gain multiplier before the primary signal is looped back to its source.

Figure 24:
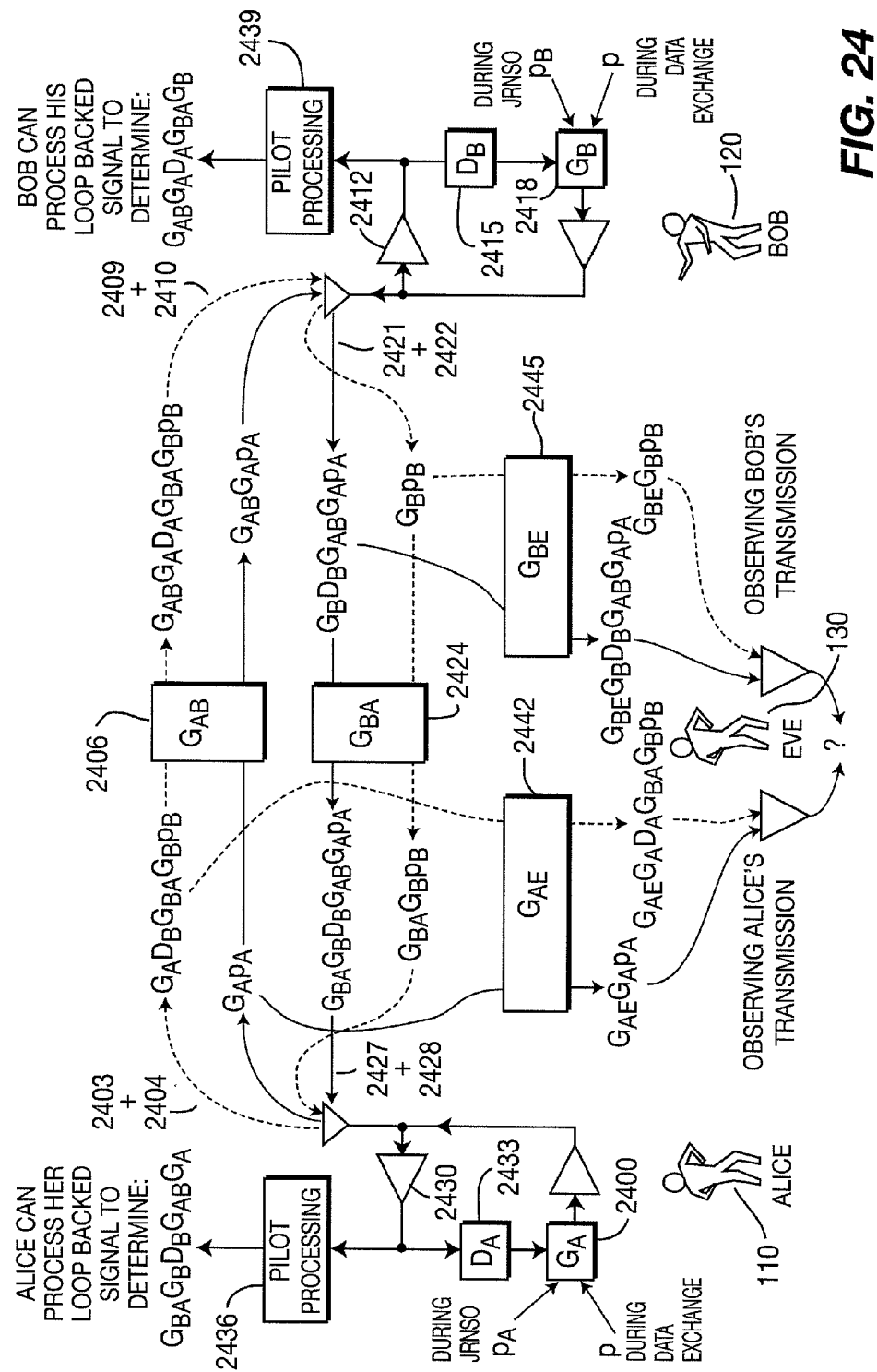
FIG. 24 shows an example of a JRNSO procedure in FDD symmetric MIMO.

FIG. 24 is an example of a block diagram of signal flow in FDD mode. Gain multipliers Dx are used to amplify the primary signal before the primary signal is looped back to its source.

Alice's 110 loop back process begins at 2400 when Alice 110 multiplies a private pilot $p_A$ by a private function $G_A$. At 2403, Alice 110 transmits the signal $G_A p_A$ over channel $G_{AB}$ 2406 to Bob 120, creating a resulting signal $G_{AB}G_A p_A$. At 2409, Bob 120 receives the signal $G_{AB}G_A p_A$. At 2412, Bob 120 translates the signal to baseband. At 2415, Bob 120 amplifies the signal with a gain multiplier DB. At 2418, Bob 120 applies a private gain function $G_B$ to the signal. At 2421, Bob 120 transmits the signal $G_B D_B G_{AB} G_A p_A$ to Alice 110 over a channel with a different frequency $G_{BA}$ 2424, creating a resulting signal $G_{BA}G_B D_B G_{AB} G_A p_A$. At 2427, Alice 110 receives the signal $G_{BA}G_B D_B G_{AB} G_A p_A$.

Bob's 120 loop back process begins at 2418 when Bob 120 multiplies a private pilot $p_B$ by a private function $G_B$. At 2422, Bob 120 transmits the signal $G_B p_B$ over channel $G_{BA}$ 2424 to Alice 110, creating a resulting signal $G_{BA}G_B p_B$. At 2428, Alice 110 receives the signal $G_{BA}G_B p_B$. At 2430, Alice 110 translates the signal to baseband. At 2433, Alice 110 amplifies the signal with a gain multiplier $D_A$. At 2400, Alice 110 applies a private gain function $G_A$ to the signal. At 2428, Alice 110 transmits the signal $G_A D_A G_{AB} G_B p_B$ to Bob 120 over channel $G_{AB}$ 2406, creating a resulting signal $G_{AB}G_A D_A G_{BA}G_B p_B$. At 2410, Bob 120 receives the signal $G_{AB}G_A D_A G_{BA}G_B p_B$.

After Alice has completed her loop back process, Alice 110 has observed $G_{BA}G_B D_B G_{AB} G_A p_A$. At 2436, Alice 110 processes her private pilot $p_A$ to determine $G_{BA}G_B D_B G_{AB} G_A$. After Bob 120 has completed his loop back process, Bob 120 has observed $G_{AB}G_A D_A G_{BA}G_B p_B$. At 2439, Bob 120 processes his private pilot $p_B$ to determine $G_{AB}G_A D_A G_{BA}G_B$.

Eve 130 may monitor Alice's 110 transmissions over channel $G_{AE}$ 2442 and Bob's 120 transmissions over channel $G_{BE}$ 2445. If Eve 130 is monitoring Alice's 110 transmissions, Eve 130 observes $G_{AE}G_A p_A$ and $G_{AE}G_A D_A G_{BA}G_B p_B$. If Eve 130 is monitoring Bob's 120 transmissions, Eve 130 observes $G_{BE}G_B p_B$ and $G_{BE}G_B D_B G_{AB} G_A p_A$. Because Eve 130 does not know either pilot $p_A$ or $p_B$, Eve 130 is unable to calculate the channel transforms. As in similar examples, the switch over delay exceeds the maximum channel coherence time.

In this embodiment, information is extracted by selecting the relative complex vector rotations values of the eSpMS. For example, the complex vector rotation values may be the angular rotation, or the Input phase to Quadrature phase amplitude ratio. Because the gain multipliers are real valued diagonal matrices, each received stream may be multiplied by a different compensating gain value. Alternatively, a single averaged gain value may be used to amplify each received stream to reduce the product of all the received streams to a single value. In the case of a single gain for all signals, relative received power levels may be exploited. In the case of different path compensating gains, the relative gain loss between the paths can not be exploited.

Although features and elements are described above in particular combinations, each feature or element can be used alone without the other features and elements or in various combinations with or without other features and elements. The methods or flow charts provided herein may be implemented in a computer program, software, or firmware incorporated in a computer-readable storage medium for execution by a general purpose computer or a processor. The above embodiments, which are discussed relative to FDD mode, also apply to TDD mode. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSp), a plurality of microprocessors, one or more microprocessors in association with a DSp core, a controller, a microcontroller, Application Specific Integrated Circuits (ASICs), Field programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) or Ultra Wide Band (UWB) module.

What is claimed is:

1. A method in a wireless communications network for determining a Joint Randomness Not Shared by Others (JRNSO), the method comprising
transmitting a first signal, including a first pilot, from a first transmit element during a JRNSO period, upon applying a first JRNSO function to the first signal;
receiving a second signal, including a second pilot and a second channel effect, over a first receive element and at least one second receive element during the JRNSO period, wherein a second JRNSO function has been applied to the second signal;
transmitting two versions of a third signal that comprises the second signal, from the first transmit element during the JRNSO period, upon applying the first JRNSO function to the third signal, wherein a first version of the third signal comprises a first receive element version and a second version of the third signal comprises at least one second receive element version;
receiving a fourth signal, including the first signal, a first channel effect and the second channel effect, over the first receive element and the at least one second receive element during the JRNSO period, wherein the second JRNSO function has been applied to the fourth signal;
processing the received signals to determine overall channel effects;
determining the JRNSO based on the determined overall channel effects; and
transmitting a fifth signal, during a data period, upon applying a data function to the fifth signal.

2. The method of claim 1 wherein the first pilot is a first private pilot sequence and the second pilot is a second private pilot sequence.

3. The method of claim 1 wherein the first signal includes a first private gain function effect and the second signal includes a second private gain function effect.

4. The method of claim 3 wherein the third signal includes a first private gain function, and the fourth signal includes a second private gain function and is multiplied by the same first private gain function upon its reception.

5. The method of claim 1 wherein the first pilot is a public pilot.

6. The method of claim 1 wherein false modulations are introduced to each of the signals.

7. The method of claim 6 wherein the false modulation is introduced after receiving the fourth signal.

8. The method of claim 1 further comprising controlling a signal to noise ratio over a channel.

9. The method of claim 1 wherein the first and third signals are transmitted over a first channel and the second and fourth signals are received over the first channel, using a time division duplex (TDD) communication mode.

10. The method of claim 1 wherein the first and third signals are transmitted over a first channel and the second and fourth signals are received over a second channel, using a frequency division duplex (FDD) communication mode.

11. The method of claim 1 wherein the first signal and second signal include pilots, and the second signal includes the effects of a second gain multiplier and the third signal includes the effects of a first gain multiplier.

12. The method of claim 1 wherein the first signal is transmitted from a first transmit element and at least a second transmit element; and
the third signal is transmitted from the first transmit element and the at least second transmit element.

13. The method of claim 1 wherein the overall channel effects are determined using symmetric properties of matrix functions.

14. The method of claim 1 wherein the fourth signal is received before the second signal.

15. The method of claim 1 wherein the first transmit element and the first receive element are a same transmit/receive element.

16. The method of claim 1 wherein the at least one second receive element comprises at least one second transmit element.

17. The method of claim 1 wherein there is a delay between the JRNSO period and the data period, and wherein the delay is greater than a maximum coherence time.

18. A wireless transmit/receive unit (WTRU) for determining a Joint Randomness Not Shared by Others (JRNSO), the WTRU comprising:
a transmitter comprising a first transmit element, the transmitter configured to transmit:
a first signal, including a first pilot, from the first transmit element,
two versions of a third signal that comprises a second signal, from the first transmit element, wherein a first version of the third signal comprises a first receive element version, wherein a second version of the third signal comprises at least one second receive element version, and wherein the transmitter is further configured to transmit the first signal and the third signal during a JRNSO period, and
a fifth signal, wherein the fifth signal is transmitted during a data period;
a receiver comprising a first receive element and at least one second receive element, the receiver configured to receive:
the second signal, including a second pilot and a second channel effect, over the first receive element and the at least one second receive element, and
a fourth signal including the first signal, a first channel effect and the second channel effect, over the first receive element and the at least one second receive element, wherein the receiver is further configured to receive the second signal and fourth signal during the JRNSO period, and a second JRNSO function has been applied to the second signal and the fourth signal; and
a processor configured to:
apply a first JRNSO function to the first signal during the JRNSO period,
apply the first JRNSO function to the third signal during the JRNSO period,
process the received signals to determine overall channel effects,
determine the JRNSO based on the determined overall channel effects, and
apply a data function to the fifth signal during the data period.

19. The method of claim 18 wherein the first pilot is a first private pilot sequence and the second pilot is a second private pilot sequence.

20. The WTRU of claim 19 wherein the third signal includes a first private gain function, and the fourth signal includes a second private gain function and is multiplied by the same first private gain function upon its reception.

21. The WTRU of claim 19 wherein the first and third signals are transmitted over a first channel and the second and fourth signals are received over a second channel, using a frequency division duplex (FDD) communication mode.

22. The WTRU of claim 18 wherein the first signal includes a first private gain function effect and the second signal includes a second private gain function effect.

23. The WTRU of claim 18 wherein the processor is further configured to introduce false modulations to each of the signals.

24. The WTRU of claim 23 wherein processor is further configured to introduce the false modulation after receiving the fourth signal.

25. The WTRU of claim 18 wherein the processor is further configured to control a signal to noise ratio over a channel.

26. The WTRU of claim 18 wherein transmitter is further configured to transmit the first and third signals over a first channel and the receiver is further configured to receive the second and fourth signals over the first channel, using a time division duplex (TDD) communication mode.

27. The WTRU of claim 18 wherein the first signal and second signal include pilots, and the second signal includes the effects of a second gain multiplier and the third signal includes the effects of a first gain multiplier.

28. The WTRU of claim 18 wherein the processor is configured to determine the overall channel effects using symmetric properties of matrix functions.

29. The WTRU of claim 18 wherein the receiver is further configured to receive the fourth signal before the second signal.

* * * * *